United States Patent
Folgar

(10) Patent No.: US 10,448,695 B2
(45) Date of Patent: *Oct. 22, 2019

(54) BALLISTIC HELMETS AND METHOD OF MANUFACTURE THEREOF

(71) Applicant: INTER Materials LLC, Midlothian, VA (US)

(72) Inventor: Francisco Folgar, Midlothian, VA (US)

(73) Assignee: Inter Materials, Inc., Midlothian, VA (US)

( * ) Notice: Subject to any disclaimer, the term of this patent is extended or adjusted under 35 U.S.C. 154(b) by 598 days.

This patent is subject to a terminal disclaimer.

(21) Appl. No.: 15/096,085

(22) Filed: Apr. 11, 2016

(65) Prior Publication Data

US 2017/0027268 A1    Feb. 2, 2017

Related U.S. Application Data

(63) Continuation of application No. 13/844,109, filed on Mar. 15, 2013, now Pat. No. 9,307,803.

(51) Int. Cl.
| | | |
|---|---|---|
| *A42C 2/00* | (2006.01) | |
| *B29C 70/44* | (2006.01) | |
| *F41H 1/08* | (2006.01) | |
| *F41H 5/04* | (2006.01) | |
| *B29C 43/02* | (2006.01) | |
| *B29L 31/48* | (2006.01) | |

(52) U.S. Cl.
CPC .............. *A42C 2/005* (2013.01); *B29C 43/02* (2013.01); *B29C 70/44* (2013.01); *F41H 1/08* (2013.01); *F41H 5/0471* (2013.01); *B29L 2031/4821* (2013.01)

(58) Field of Classification Search
CPC ............................ B29C 70/342; B29C 70/345
See application file for complete search history.

(56) References Cited

U.S. PATENT DOCUMENTS

| | | |
|---|---|---|
| 2,420,522 A | 5/1947 | Daly |
| 2,423,076 A | 7/1947 | Daly |
| (Continued) | | |

FOREIGN PATENT DOCUMENTS

| | | |
|---|---|---|
| WO | 2010019697 | 2/2010 |
| WO | 2011163486 | 12/2011 |

OTHER PUBLICATIONS

Riewald et al., "Light Weight Helmet from a New Aramid Fiber," 23rd International SAMPE Technical Conference , Oct. 21-24, 1991, Kiamesha Lake, New York. vol. 23, 684-695.

(Continued)

*Primary Examiner* — Matthew J Daniels
(74) *Attorney, Agent, or Firm* — Miles and Stockbridge, P.C.; David R. Schaffer

(57) ABSTRACT

A method for manufacturing a high performance thermoplastic matrix composite ballistic helmet includes forming/shaping highly consolidated helmet preforms free of wrinkles and with no cuts or seams from a flat stack of 0/90 uni-directional prepreg layers, both with and without carbon epoxy skins or layers, using a pressure forming process. The wrinkle free and no cuts pre-formed helmet shell is preheated and placed between match-metal dies in a compression molding press to be molded under constant pressure during heating at high temperature and cooling down to below 160° F. in less than 45 minutes.

16 Claims, 11 Drawing Sheets

(56) References Cited

U.S. PATENT DOCUMENTS

| | | | |
|---|---|---|---|
| 2,451,483 A | | 10/1948 | Goldsmith |
| 2,532,442 A | | 12/1950 | Daly |
| 2,610,322 A | | 9/1952 | Daly |
| 4,044,188 A | * | 8/1977 | Segal .................. B29C 70/025 |
| | | | 428/297.4 |
| 4,338,070 A | | 7/1982 | Nava |
| 4,596,056 A | | 6/1986 | Grick |
| 4,690,860 A | * | 9/1987 | Radvan ................ B29B 15/105 |
| | | | 264/257 |
| 4,778,638 A | | 10/1988 | White |
| 4,908,877 A | | 3/1990 | White |
| 4,916,000 A | | 4/1990 | Li |
| 5,173,138 A | | 12/1992 | Blauch |
| 5,635,288 A | | 6/1997 | Park |
| 5,952,078 A | | 9/1999 | Park |
| 6,631,630 B1 | | 10/2003 | Pourboghrat |
| 7,148,162 B2 | | 12/2006 | Park |
| 2007/0099526 A1 | | 5/2007 | van Heerden |
| 2007/0194490 A1 | | 8/2007 | Bhatnagar |
| 2011/0014315 A1 | | 1/2011 | Okoli |

OTHER PUBLICATIONS

Yadav et al., "Process doe Hydroforming Sheet Metal—Part II: Sheet Hydroforming with a Punch." Stamping Journal Mar. 2006: 44-45.
Dyneema HB80 Product Specification Sheet, Feb. 26, 2014, 1 page.
Dyneema HB80 Product Specification Sheet, Jun. 2011, 2 pages.
Honeywell Spectra Shield II SR-3130 Product Information Sheet, 2012, 2 pages.

* cited by examiner

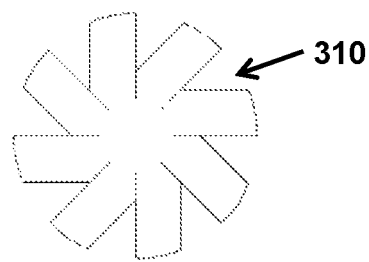
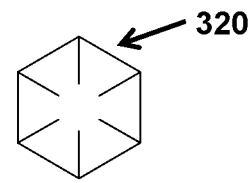
(PRIOR ART)
Figure 3a
(PRIOR ART)
Figure 3b
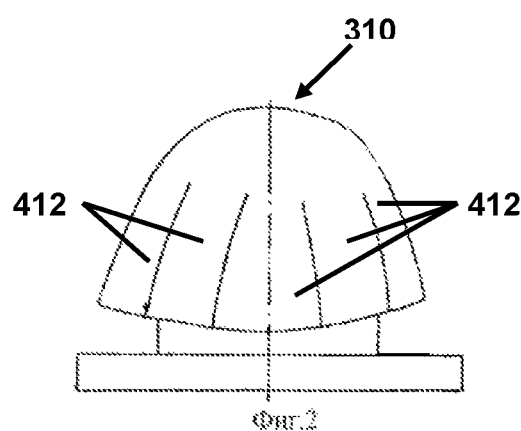
(PRIOR ART)
Figure 4
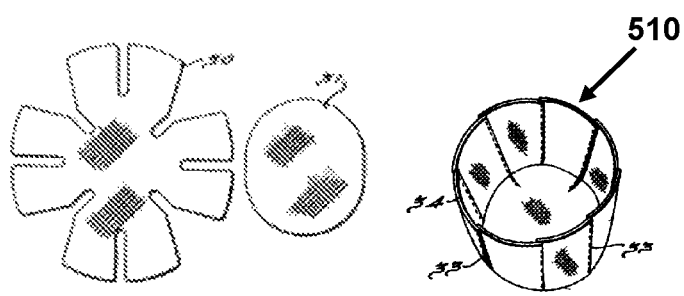
(PRIOR ART)
Figure 5

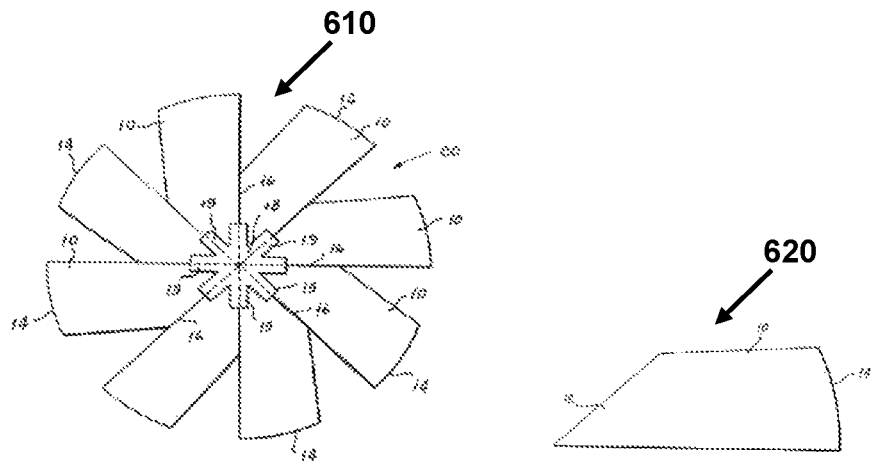
(PRIOR ART)
Figure 6a
(PRIOR ART)
Figure 6b
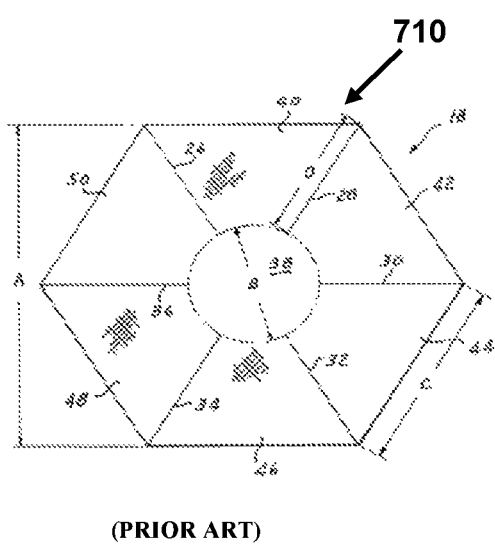
(PRIOR ART)
Figure 7

STEP 1
A metal blank is placed on blankholder ring.

STEP 2
Top of press lowered and fluid chamber pressurized.

STEP 3
Punch pushes upward, forming metal blank against pressure chamber.

STEP 4
Top of press raised, pressure released, and punch lowered. The part is now finished.

BALLISTIC HELMETS AND METHOD OF MANUFACTURE THEREOF

FIELD OF THE INVENTION

This invention is in the field of ballistic helmets and particularly relates to an improved method of making ballistic helmets utilizing thermoplastic matrix composite materials. More particularly, the invention relates to a method for producing a pre-consolidated helmet preform with no cuts or seams and a method of molding the helmet under very high pressure during the cooling down cycle.

BACKGROUND

Ballistic Helmets

The current U.S. Army Advanced Combat Helmet (ACH) is an improvement over the PASGT system (Personnel Armor System-Ground Troops). The PASGT helmet was developed in the late 1970's by research scientists at the U.S. Army Natick Research, Development and Engineering Center, Natick, Mass.

The PASGT helmet with an areal density of approximately 330 oz/yd$^2$ (2.30 psf or 11.2 Kg/m$^2$) is still being manufactured using a Kevlar® fabric coated or impregnated with a thermoset resin that is a 50/50 blend of the phenol thermoset and a polyvinyl butyral thermoplastic toughener, which is referred to as a "prepreg". The PASGT helmet fabric is made with a 1500 denier Kevlar® 29 yarn in a 2×2 basket fabric construction that weighs 14.0 oz/yd$^2$ (475 g/m$^2$). The Kevlar® prepreg is a Kevlar® fabric impregnated with 16-18% by weight of Polyvinyl Butyral (PVB)-phenolic resin. The helmets are fabricated by assembling a helmet preform using 19 equivalent layers of prepreg. These layers are then compression molded at constant temperature and rather substantial compression pressures using self-trimming matched metal molds at a rate of one helmet every 12-15 minutes. (1 oz/yd$^2$=33.94 gr/m$^2$).

Because of the thermoset nature of the PVB-phenolic resin matrix, molding of the standard PASGT helmets requires constant temperatures between 320-355° F. (160-180° C.) and pressures well over 500 psi for roughly 12-15 minutes on average for the resin to fully cure.

The ballistic properties of the helmet are normally measured by the ballistic limit $V_{50}$ (m/s) test, according to known US and European standards. In general, a ballistic limit $V_{50}$ (f/s) is measured to determine the ballistic performance of a material or system and is defined as the velocity at which the probability of penetration of a bullet or projectile is 50 percent. The test procedure is specified on the MIL-STD-662F latest revision dated Dec. 18, 1997. Although the military MIL-H44099-A specification for PASGT helmets requires a ballistic performance with a ballistic limit, $V_{50}$ (f/s), of at least 2000 f/s, most PASGT helmets measure around 2100 f/s V50 against 17 grain fragment simulators projectiles (FSP) during quality assurance lot testing.

In the case of a medium size PASGT helmet, 19 layers were required to deliver a helmet with the target weight or areal density of 2.3 lb/ft$^2$ (11.2 Kg/m$^2$). To obtain 19 equivalent layers during the preform assembly, the helmet preform was put together using 16 pinwheels/rosettes and 3 crown pieces. The reason is because the pinwheels/rosettes petals (legs) overlap during the preform assembly, providing an increase of layers on the side of the helmet walls higher than the crown area. Therefore, crown patches of preform material are placed in the crown area of the helmet to compensate and balance the number of layers.

In addition, using Kevlar® fabrics impregnated with PVB-phenolic resins (prepreg) as preform material, "directionality" of the fibers within the fabric has never been a consideration to provide higher ballistic performance in a helmet. In fact, when the KM2 Kevlar® helmet was developed at DuPont back in 1990, the ballistic improvements came from improvements in the properties of the fibers, fabric and surface treatment. Thus, the KM2 helmet produced a 15% lighter helmet shell with superior ballistic performance to the incumbent Kevlar® 29 PASGT helmet system by using 850 denier Kevlar® KM2 fiber, a higher toughness Kevlar® fiber than the 1500 denier Kevlar® 29 used in the standard PASGT. The helmet also used a finer Kevlar® yarn denier, a greater ply count with a lighter fabric and a special fiber surface treatment to control the adhesion strength between the PVB-phenolic resin and the fiber surface.

DuPont presented the concept of improved ballistic performance of a helmet by using a greater number of Kevlar® prepreg layers (ply count) with lighter fabrics in a paper dated Oct. 22, 1991, at the Society for the Advancement of Materials and Process Engineering (SAMPE) International Technical Conference (see, Riewald, P. G., F. Folgar, H. H. Yang, W. F. Shaughnessy, "Light Weight Helmet from a New Aramid Fiber," 23rd International SAMPE Technical Conference, Oct. 21-24, 1991, Kiamesha Lake, N.Y. Vol. 23, 684-695).

One of the US Army greatest challenges has been to reduce the weight of personnel body armor carried by a soldier, including ballistic vests and helmets. Recent studies have identified material combinations that could meet both structural and ballistic requirements at lighter weights. More compliant matrix ballistic materials suggest the potential for greater ballistic efficiencies than the existing helmet materials. High ballistic efficiency fibers such as p-aramid, PBZ and ultra-high molecular weight polyethylene (UHMWPE) when combined with a thermoplastic (TP) matrix will improve the ballistic protection beyond that afforded by the incumbent phenolic thermoset resin systems.

High Performance Fibers, Fabric Structures and Matrix Resins

Some of the limitations for further ballistic improvements in a helmet when using a finer Kevlar® yarn denier, a greater ply count with a lighter fabric and a special fiber surface treatment come from the use of woven fabrics itself. As shown in FIG. 1, during a ballistic impact, the individual yarns in a woven fabrics are constrained at the crossover points 110. The tensile wave propagated along the longitudinal direction of the yarns is reflected at the crossover points breaking the yarns much before the maximum amount of energy can be absorbed along its length. Therefore one way to improve the ballistic performance of woven fabrics was to reduce the cross over points by reducing the fabric crimp and/or spreading the crossover points farther apart by weaving fabrics in a more open construction.

These open fabric constructions resulted, for the same yarn denier, in more layers (ply count) of a lighter fabric to meet given ballistic requirements. The physics behind the improvement in ballistic performance due to more layers of a lighter fabric for the same total areal density is attributed to a more uniform distribution of the impact energy throughout more fabric layers and a reduced density of crossover points.

Since there is a limit to how open a woven fabrics could be before it loses all its properties as a ballistic fabric due to becoming like an open net, the next step to improve the ballistic performance of woven fabrics was to reduce the yarn crimp. Modern weaving equipment spread the filaments of the yarns in a flat and oriented fashion on a loom giving rise to what is currently known as uni-directional fabric construction. Since uni-directional fabric constructions have very little crimp, two of the most common methods to hold together two or more layers of uni-directional fabrics are by using a low modulus thermoplastic film to bond the fabric layers together or using fine denier yarns of low tensile modulus and low strength fibers to stitch the layers together.

A common uni-directional fabric construction has two layers with their yarns at 90 degrees from each other bonded together by a thermoplastic film or stitched together by a fine denier yarn (FIG. 2). This uni-directional construction is known as 0°/90° fabric, or 0/90 for short. When a uni-directional fabric construction requires more than two layers, the orientation of the yarns change only 90 degrees from the yarn orientation of the next layer. As an example, in a four layers uni-directional fabric construction, the orientation of the yarns will have a 0°/90°/0°/90° orientation sequence.

When compared with woven fabrics, the yarns are less constrained in the uni-directional fabric constructions because the crossover points and the crimp have been highly reduced resulting in ballistic articles with a much lower areal density for the same ballistic requirements. The areal density of an article is its weight divided by its area. The higher ballistic efficiency of uni-directional fabrics is then attributed to the fact that the yarns can dissipate more impact energy along their length resulting in the impact energy being transmitted to a much larger area within each uni-directional fabric layer away from the place of impact.

Some examples of commercially available uni-directional fabric constructions made with para-Aramid fiber yarns, hereby incorporated by reference, are disclosed on patents issued to Andrew Park and a patent issued to Barrday. Andre Park's patents (U.S. Pat. Nos. 5,635,288; 7,148,162; 5,952,078) discloses a uni-directional fabric construction of two layers of high performance fibers cross-plied (0/90 orientation) bonded together by a thermoplastic film or scrim where it claims that the film or scrim, once laminated by heat and pressure, do not penetrate the fiber filaments inside the yarn. Barrday's patent US 2007/0099526 also discloses a two layers 0/90 uni-directional fabric construction where it claims that the yarns are held together by stitching with a finer lower modulus yarn that Barrday refer as encapsulating yarns. In both cases, when testing articles with multiple layers using the same fiber yarn denier and with the same total areal density, they have demonstrated that the uni-directional fabric constructions have higher ballistic performance than the equivalent woven fabrics.

A more relevant class of uni-directional materials for fabricating high performance ballistic helmets are commercially available with the trade names of Spectra Shield from Honeywell International and Dyneema from DSM-Dyneema Corporation. Both of these brands are sheet-like array of high performance Ultra High Molecular Weight Polyethylene (UHMWPE) fiber filaments in which the filaments are aligned parallel to each other and coated or impregnated with a thermoplastic elastomer matrix as a prepreg. Hereby incorporated by reference, Honeywell patent U.S. Pat. No. 4,916,000 discloses the basic uni-directional sheet structure of Spectra Shield where it claims that the matrix impregnates the single filaments. U.S. Pat. No. 5,173,138 patent teaches a method for the continuous and automatic production of the cross-plied Spectra Shield material where two layers of the sheet-like prepreg are cross-plied together at a 90 degree angle to produce a single sheet 0/90 construction of ballistic material.

Helmet Preform

As discussed above, the PASGT helmets are fabricated by assembling a helmet preform using 19 equivalent layers of prepreg. These layers are then compression molded at constant temperature under rather substantial compression pressures using self-trimming matched metal molds at a rate of one helmet every 12-15 minutes. In the case of a medium size PASGT helmet, 19 layers were required to deliver a helmet with the target weight or areal density of 2.3 psf (lb/ft$^2$). To obtain 19 equivalent layers during the preform assembly, the helmet preform was put together using 16 pinwheels/rosettes 310 and 3 crowns 320 (FIGS. 3a and 3b). The reason is because the pinwheels/rosettes petals (legs) 412 overlap during the preform assembly (FIG. 4), providing an increase of layers on the side of the helmet walls higher than the crown area. Therefore, the crown patches 320 of preform material are placed in the crown area of the helmet to compensate and balance the number of layers, FIG. 3 (b).

The use of preform patterns to facilitate the fabrication of helmets is mentioned as early as 1942 in US patents including, for example, U.S. Pat. Nos. 2,420,522, 2,423,076, 2,532,442 and 2,610,322 to Le Grand Daly, as well as U.S. Pat. No. 2,451,483 to Goldsmith. Daly's patents, hereby incorporated by reference, teach the use of the pinwheel helmet preform pattern. In particular, U.S. Pat. Nos. 2,423,076 and 2,532,442 are directed to a conventional practice of making safety helmets from flat sheets of plastic impregnated fabrics in a speedier and more convenient manner. Daly patents uses the shape of the individual pieces, already referred to as "preforms" or "pre-forms", and their arrangement in the helmet in a way that the seams are mutually staggered, assembled as going into the molding dies without bending or moving any pieces from their respective places in the "preforms," preventing formation of wrinkles and folds, and yet no thick portions having excess of material in the helmet. FIG. 5 is a view illustrating the "preforms" 30,31 from Daly prior to and after being folded together to form a bowl-shaped assembly 510, which is ready to be assembled for molding.

Forty years later in the early 1980's, with the availability of Kevlar® as a new high performance fiber developed and commercialized by E.I. DuPont de Nemours, and better suited for the fabrication of ballistic helmets; it was apparent that materials cost became a pressing issue since a large number of plies were required for a specific level of ballistic protection. It was also apparent that although using Daly's preform patterns to be laid up in a mold and pressed into a helmet resulted in a high quality method of making a helmet; it did not make efficient use of the prepreg material because of the waste during the cutting process.

In 1983 Gentex Corporation filed for a patent addressing a more efficient use of prepreg materials by introducing a preform pattern design which substantially reduced the amount of prepreg needed to make a helmet shell, see, for example, Grick's U.S. Pat. No. 4,596,056. As shown in FIG. 6a, a helmet pinwheel pattern 610 increased the efficiency of the prepreg materials by the method used in putting together the pinwheel. FIG. 6b shows a single pinwheel segment 620 that is joined together with seven other pinwheel segments 620 by stitching or by a heat sensitive tape at the center to form the pinwheel pattern 610 of FIG. 6a. Cutting pinwheel segments 620 with the same shape and size reduced the waste during the cutting process from a roll of fabric prepreg.

Since the assembly of a preform into a molded helmet shell leaves one ballistically weak spot on top of the helmet, Gentex Corporation later improved their helmet preform pattern design as in U.S. Pat. Nos. 4,778,638 and 4,908,877 in which a ballistic helmet is made with an efficient use of the prepreg fabric material and without sacrificing any degree of ballistic protection around the whole helmet. This is accomplished by using preform patterns of hexagonal shape 710 that have a slit from the corners of the hexagon up to a certain distance from the center as shown in FIG. 7. The efficiency of the prepreg fabric usage came from the reduction of waste during cutting the hexagonal shape of the preform patterns and the staggering of the hexagonal patterns of different sizes during the assembly of the preform before being laid into the compression molding dies.

Molding of Ballistic Helmets.

In general, some of the molding methods known in the prior art for making ballistic helmets includes the use of matched metal dies, i.e., a male mold 810 and a female 820 mold for the compression molding of a preform 830. As an example, because of the thermoset nature of the PVB-phenolic resin matrix, compression molding of a Kevlar/PVB-phenolic PASGT helmet 840 requires constant temperatures between 320-355° F. (160-180° C.) and pressures over 500 psi for about 12-15 minutes on average for the resin to fully cure, as shown in FIG. 8.

Other molding methods for making helmets include the use of a metal female mold and a flexible bladder to form the helmet preform, consolidate it, and cure it under high temperature and pressure as disclosed in U.S. Pat. Nos. 2,420,522, 2,423,076, 2,532,442 and 2,451,483.

U.S. Pat. Nos. 2,420,522, 2,423,076 and 2,532,442 are directed to a molding method for making safety helmets using plastic impregnated fabrics. The method includes the steps of folding the pinwheel patterns into a preform closer to the helmet shape, assembling the preform and laying down the helmet preform inside a female cavity. The method also includes using pinwheel patterns to reduce or eliminate wrinkles or folds when the pinwheel edges (petals) overlap, therefore avoiding the breaking or damaging of the fibers in the fabric during the preform assembly step. The final steps of of the method include molding and curing of the helmet preform shown in FIG. 9. In FIG. 9, which corresponds to FIG. 18 from U.S. Pat. No. 2,420,522, the helmet preform is seen laying down on the surface of a female metal mold than is later pressed against the wall of that mold by the expansion of a rubber bladder under the action of hydraulic pressure. In Daly's molding method, a uniform pressure is exerted at all points and in all direction on the helmet while being molded and cured. The molding pressures used were much lower than 1000 pounds per square inch (psi) and applied during the entire curing cycle of the helmet. This was particularly important to the invention because it was considered that the fibers in a plastic impregnated fabric were damaged if the prepreg was stretched during the molding process as in the stretching of a metal sheet during stamping. Daly's patents also showed the use of the rubber bladder and a female cavity for molding and curing a helmet, the need for steel match-metal dies was eliminated, which were more expensive and took a long time to fabricate.

U.S. Pat. No. 2,451,483 disclosing a similar molding method as Daly for making protective helmets where the use of clover leaf shaped pinwheels and a female mold cavity capable of incorporating a part line, drill hole marks and a negative surface draft were also disclosed.

U.S. Pat. No. 4,338,070 to Pier L. Nava from Italy discloses a molding equipment and process to form a complex shape such a helmet inside a female cavity by hydraulically pressing a flexible bladder as a male mold. Navas also claims a better liquid infiltration molding process than an autoclave for resin to penetrate a fabric preform in order to obtain uniform wall thickness of complex parts containing negative surface draft and surface projections is shown in FIG. 10. FIG. 10, which is hereby incorporated in its entirety by reference, corresponds to FIG. 3 from Nava.

Dickson from Armorsource filed International Patent Application Publication Number WO2010019697 that was directed to the use of a flexible elastomeric bladder to pressurize a helmet preform by hydraulic means placed in between a female cavity and a male core as shown in FIG. 11. FIG. 11 corresponds to FIG. 3 in WO2010019697 with striking similarities to FIG. 3 in U.S. Pat. No. 4,338,070. Dickson is also directed to the use of uni-directional prepreg materials and the need for very high pressures to be continuously and uniformly applied during all the stages of molding and curing of the helmet preform. Dickson also disclosed that both elevated temperatures and pressures are required to be maintained throughout their entire molding process where the resin from the prepreg material melts and undergoes a phase change in order to form a composite helmet. The patent also teaches the use of helmet prepreg pinwheel patterns (packets) that can be formed into a helmet shape preform in a pre-molding step before molding to facilitate the assembling of a three-dimensional shape without additional wrinkles and folds.

Helmet Ballistic Performance

Since the late 1980s thru the 1990s improvements with ballistic performance and weight reduction of PVB-phenolic aramid fabric helmet systems included the 850 denier Kevlar® KM2 fiber system developed by DuPont in 1990. Table 1 provides a comparison between the PASGT helmet and the KM2 helmet.

TABLE 1

Ballistic Performance of PASGT vs. KM2 Kevlar Helmets.

| Properties | PASGT Helmet | Kevlar ® KM2 Helmet |
|---|---|---|
| Areal Density, psf | 2.30 | 1.95 |
| Yarn Denier/Fiber | 1500 denier, Kevlar ® 29 | 850 denier, Kevlar ® KM2 |
| Fabric Construction/Weight | 2 × 2 basket, 475 g/m² | 31 × 31 plain weave, 234 g/m² |
| Matrix Resin/Weight Fraction | PVB-phenolic, 16-20% | PVB-phenolic, 16-18% |
| Molding Process | Compression Molding | Compression Molding |
| Molding Cycle time, min | 10-15 min | 10-15 min |
| V50 (f/s), 17 grain fsp | 2,100 f/s | 2,200 f/s |

As seen in Table 1, the KM2 helmet is a 15% lighter helmet shell with superior ballistic performance to the Kevlar® 29 PASGT helmet system. This improvement was achieved mostly by using a higher toughness Kevlar® fiber than the 1500 denier Kevlar® 29 used in the standard PASGT, finer Kevlar® yarn denier, greater ply count and a special fiber surface treatment to control the adhesion strength between the PVB-phenolic resin and the fiber surface. However the ballistic performance improvement were between 5-12% range against RCC and chisel nose fragment simulator projectiles (FSP).

More compliant matrix ballistic materials developed during the 1980s and 1990s have shown the potential for greater ballistic efficiencies than the existing helmet para-Aramid/PVB-phenolic materials. High ballistic efficiency fibers such as ultra-high molecular weight polyethylene (UHMWPE), when combined with thermoplastic matrices, improve the ballistic protection beyond that afforded by the incumbent phenolic thermoset resin systems.

Publically available information on ballistic performance of ballistic helmets is limited at best. Most of the available information is for ballistic performance of materials tested as a flat panels. For example, U.S. Pat. No. 6,183,834 to Van der Loo is directed to a ballistic-resistant flat panel made by a compressed stack of layers containing 0/90 uni-directionally oriented reinforcing UHMWPE fibers with up to 30 wt. % of a thermoplastic matrix material to provide protection against impacts of projectiles such as shrapnel or bullets. In addition to the Ballistic Limit, $V_{50}$ (m/s), Van der Loo uses the Specific Energy Absorption (SEA) to measure the amount of energy absorbed by a molded panel on impact of a projectile per unit areal density of the molded panel. SEA is defined as:

$$SEA=\frac{1}{2}*m*(V_{50})^2/AD,$$

where m is the mass of the projectile, $V_{50}$ (m/s) is the ballistic limit of the projectile, and AD is the areal density of the molded panel. Van der Loo found that very high values of SEA of at least 110 Jm²/kg against a 7.62×39 Mild Steel Core P.S. Ball M1943 are achieved when the compressed stack of uni-directional UHMWPE material reaches at least 98.0% of the theoretical maximum density, and most preferably at least 99.5%, by compressing the stack at a pressure of at least 15 MPa (2,175 psi) during heating at an elevated temperature and during cooling down to room temperature. Van der Loo is also directed to molding at an elevated temperature by compressing the UHMWPE material at a temperature above the softening or melting point of the thermoplastic matrix material and below the softening or melting point of the fibers, recommending that the required compression time and compression temperature depend on the kind of fiber, matrix resin and on the thickness of the molded panel. Suggesting that the compression temperature for UHMWPE fibers is preferably between 115 to 130° C. and cooling to below 70° C.

US Patent Publication Number 2007/0194490 to Bhatnagar from Honeywell International, Inc. demonstrated that the ballistic performance and structural characteristics of uni-directional composite materials with thermoplastic matrix increase with increasing the molding pressure. Specifically, the uni-directional para-Aramid fibers (Twaron® T2000 from Teijin) were coated with 16% by weight of a polyurethane resin to make a uni-tape. The uni-tapes were cross-plied at 90° and multi-layer composite flat panels were pressed under different molding pressures.

In Bhatnagar, multiple layers of a 2-ply para-Aramid fiber construction were molded separately at 240° F. (115.6° C.) at a molding pressures of 500 psi (3.4 MPA) and 2500 psi (10.3 MPa) for a period of 20 minutes and allowed to cool to room temperature. Ballistic testing using a 7.62×51 mm M80 NATO bullet was carried out in accordance with NIJ Standard NIJ 0101.04 and demonstrated that the ballistic resistance was substantially higher when molding at 10.3 MPa (2500 psi) of pressure than using the same matrix resin but molding at a low pressure. Bahtanagar also disclosed that a fewer number of layers of the composite formed in accordance with the patent can obtain similar ballistic properties than with a larger number of layers which were molded under lower pressure.

However, Bahtanagar also shows that the increase in ballistic performance and structural characteristics of the uni-directional para-Aramid composite material is not guaranteed by increasing the molding pressure alone if the resin matrix is changed. Bahtanagar illustrated this behavior of uni-directional composite materials by using two different matrix resins, one thermoplastic and one thermoset. The thermoplastic was Kraton® D1107 styrene-isoprenestyrene block copolymer thermoplastic elastomer at 20% by weight and molded at 250° F. (121.1° C.) for 30 minutes. The thermoset resin was an epoxy vinylester resin (Derkane 411) at also 20% by weight and molded at 200° F. (93.3° C.) for 30 minutes. In both cases, the ballistic improvement by increasing the molding pressure was not observed. In addition, ballistic improvements of those uni-directional para-Aramid composite materials with either Kraton® or epoxy vinylester resins were not observed when testing against a 9 mm FMJ hand gun bullet either.

BRIEF DESCRIPTION OF THE DRAWINGS

FIG. 3a illustrates a top view of a prior art pinwheel/rosette helmet preform pattern.

FIG. 3b illustrates a top view of a prior art crown helmet preform pattern.

FIG. 4 shows a side view of a prior art helmet preform assembly.

FIG. 5 illustrates top views of prior art helmet preform patterns and a perspective view of an assembly made from the helmet preform patterns.

FIG. 6a illustrates a top view of a prior art pinwheel helmet preform pattern.

FIG. 6b illustrates a top view of a prior art pinwheel helmet preform segment.

FIG. 7 illustrates a top view of a prior art hexagonal helmet preform pattern design.

FIGS. 16b-d show a cross-sectional side view (FIG. 16b), a close up view of detail B from FIG. 16b (FIG. 16c), and a top perspective view of a completed ACH-style helmet (FIG. 16d) produced using the molding process shown in FIGS. 12a, 12b, 13a, 13b, in accordance with one or more embodiments of the present invention.

DETAIL DESCRIPTION OF THE INVENTION

Figure 1:
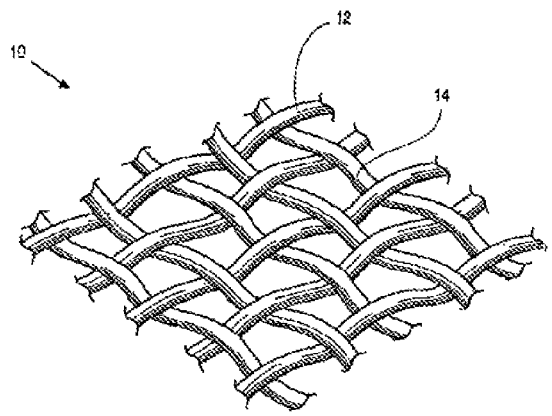
FIG. 1 illustrates a perspective view of a woven fabric used in prior art helmet systems.

High Performance Fibers, Uni-Directional Fiber Structures and Thermoplastic Matrix Resins In accordance with the present invention, a method is provided of making a ballistic resistant thermoplastic matrix composite helmet formed from a stack of 0/90 cross-plied uni-directional para-aramid or UHMWPE fibers bonded with a thermoplastic matrix resin. In general, the bonding thermoplastic matrix resin constitutes less than 30% by weight of the uni-directional 0/90 cross-plied prepreg material.

For the purposes of the present invention, a fiber includes continuous monofilament, multifilament, ribbon, strip, and other forms of discontinuous cut or staple fiber having regular or irregular cross-section where the length dimension is much greater that the width and thickness dimensions. Filaments having a cross-section aspect ratio of at most 3. The term "yarn" is a continuous strand comprised of many fibers or filaments. Therefore, for the purpose of this invention, the terms "fiber" and "yarn" are interchangeably used herein and include a plurality of any of the foregoing or a combination thereof. In general, a fiber's cross section can be circular, flat or oval.

One example of the material used for the production of a helmet shell according to the present invention is a material made of 0/90 cross-plied uni-directionally oriented high tenacity para-aramid fibers coated with a thermoplastic resin. As used herein, the term "high tenacity para-aramid fibers" means yarns which have tenacity at least about 23 g/d, a modulus of at least about 500 g/d and an energy-to-break of at least about 30 J/g. Two examples of such fibers include, but are not limited to Twaron® T2000 from Teijin Corporation and Kevlar® 129 or Kevlar® KM2 from DuPont de Nemours, both of which are particularly useful in forming ballistic resistant thermoplastic matrix composite helmets.

Another example of the material used for the production of a helmet shell according to the present invention is a material made of 0/90 cross-plied uni-directionally oriented high-drawn high tenacity Ultra High Molecular Weight Polyethylene (UHMWPE) fibers coated with a thermoplastic polyurethane resin. High molecular weight here means a molecular weight of at least 400,000 g/mol. As used herein, the term "high tenacity UHMWPE fibers" means yarns which have tenacity of at least about 35 g/d, a tensile modulus of at least about 1200 g/d, and an energy-to-break of at least about 30 J/g with a denier per filament (dpf) greater than or equal to 1.0. For example, Dyneema® HB-80 and HB-26 from DSM Dyneema Corporation and Spectra Shield® SR-3130, SR-3136 or SR-3137 from Honeywell International are particularly useful in forming ballistic resistant thermoplastic matrix composite helmets.

For the purposes of the present invention, the high tenacity para-aramid or UHMWPE fibers could be formed into woven, non-woven or knitted fabrics. A particular preferred configuration of the fibers is called a 0/90 cross-plied prepreg or 0/90 layup, where two individual plies are uni-directionally oriented fibers at 90° from each other and any successive adjacent plies are rotated relative to one another at about a 90° angle.

For the purposes of the present invention, the high tenacity para-aramid or UHMWPE fibers formed as a 0/90 cross-plied configuration or 0/90 layup, are consolidated together by a thermoplastic matrix resin that is totally impregnated into the fibers by a solution coating process or partially impregnated by film lamination. As used herein, the term "coating" is used to describe a fiber configuration wherein the individual fibers are impregnated by a continuous matrix resin. The term "lamination" is used to describe a continuous layer of the matrix resin on the surface of the fibers such as a film or a discontinuous layer, for example, a scrim, where the individual fibers are not impregnated by the continuous or discontinuous resin film or scrim.

An embodiment of the present invention includes a method of making a ballistic resistant thermoplastic matrix composite helmet formed from a stack of 0/90 cross-plied uni-directional thermoplastic matrix prepreg material containing less than 30% by weight of matrix material. For example, a thermoplastic polyurethane from about 15% to about 30% by weight because when the composite helmet is molded under high pressure during cooling, the composite helmet has improved ballistic resistance to high energy rifle bullets and reduced delamination and back face deformation against hand guns (9 mm FMJ). This is especially significant, because similar results have not been observed with para-aramid composite helmets that utilize known thermoset resin matrices.

Preform Fabrication for Thermoplastic Matrix Composite Ballistic Helmets by Pressure Forming In accordance with the present invention, a method is provided for making a ballistic resistant thermoplastic matrix composite helmet formed from a stack of 0/90 cross-plied uni-directional para-aramid or UHMWPE fibers thermoplastic matrix resin prepreg layers. The method includes pressure forming of a helmet preform using a flexible membrane, bladder or diaphragm and a lower or male die element from a stack of 0/90 cross-plied uni-directional para-aramid or UHMWPE fibers thermoplastic matrix resin prepreg layers.

The method results in a helmet preform being formed from a stack of 0/90 cross-plied uni-directional para-aramid or UHMWPE fibers thermoplastic matrix prepreg layers in which the prepreg layers are formed with no cut, no seams, no wrinkles and with a controlled orientation of all the 0/90 cross-plied uni-directional prepreg layers throughout the stack by using pressure forming. The helmet preform design where the prepreg layers are formed with no cut, no seams, no wrinkles and with a controlled orientation of all the 0/90 cross-plied uni-directional prepreg layers throughout the stack by the above-noted pressure forming method has been termed a "Solid Preform Design".

Figure 12A:
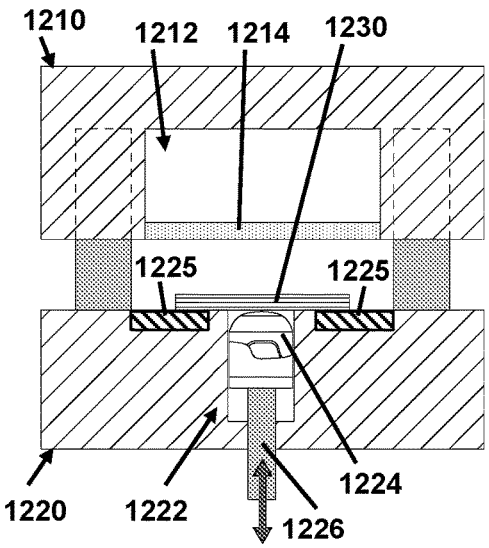
FIG. 12a illustrates a side view of a pressure forming apparatus with a flexible diaphragm or bladder in an open position and with a stack of prepreg layers over a top of a male die element, in accordance with one or more embodiments of the present invention.

Specifically, the method of pressure forming includes using a flexible bladder, membrane or diaphragm that is pressurized with air (pneumatically) or with hydraulic oil to form a wide variety of complex shapes at room temperature. FIG. 12a illustrates a side view of a pressure forming apparatus with a flexible diaphragm or bladder in an open position and with a stack of prepreg layers over a top of a male die element, in accordance with one or more embodiments of the present invention. In FIG. 12a, an upper or female element 1210 that consists of a pressurized forming chamber 1212 that is filled with air or hydraulic oil and a rubber diaphragm or bladder 1214 that is sealed across the pressurized forming chamber 1212. The lower or male die element 1222 is comprised of a punch 1224 that has the shape and dimensions of the part to be made and a blank holder ring 1225. The punch is attached to a hydraulic piston 1226 and the blank holder ring 1225 surrounds the punch 1224

Figure 12B:
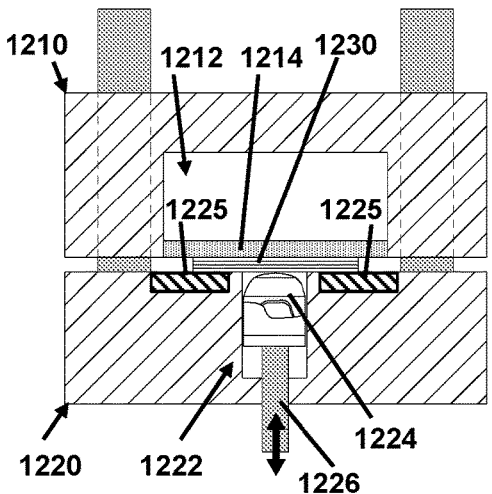
FIG. 12b illustrates a side view of the pressure forming apparatus of FIG. 12a with the flexible diaphragm or bladder in a closed position over the stack of prepreg layers, in accordance with one or more embodiments of the present invention.

FIG. 12b illustrates the same side view of the pressure forming apparatus of FIG. 12a, except now the flexible diaphragm or bladder 1214 is in a closed position over and in contact with the stack of prepreg layers 1230, in accordance with one or more embodiments of the present invention.

In FIG. 12b, the pressure forming process begins by placing a blank of material 1230 to be formed on the blank holder ring 1225. The upper chamber 1210 is closed bringing the chamber 1210 down on top of the diaphragm 1214 over the blank 1230.

The forming chamber 1212 is pressurized with oil or air while the punch is raised through the blank holder ring 1225 and into the forming chamber. Since the female portion of this forming method is rubber, the blank is formed, shaped and consolidated without the scratches associated with other shaping or forming methods and at room temperature.

Figure 13A:
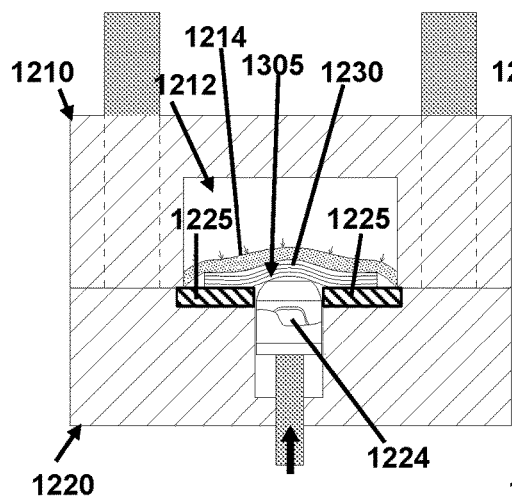
FIG. 13a illustrates a side view of the pressure forming apparatus of FIGS. 12a and 12b showing the beginning of the preform creation process with the male die element beginning to push up against the stack of prepreg layers and against the flexible diaphragm or bladder, in accordance with one or more embodiments of the present invention.

FIG. 13a illustrates a side view of the pressure forming apparatus of FIGS. 12a and 12b showing the beginning of the preform creation process with the male die element 1224 beginning to push up against the stack of prepreg layers 1230 and against the flexible diaphragm or bladder 1214, in accordance with one or more embodiments of the present invention.

Figure 13B:
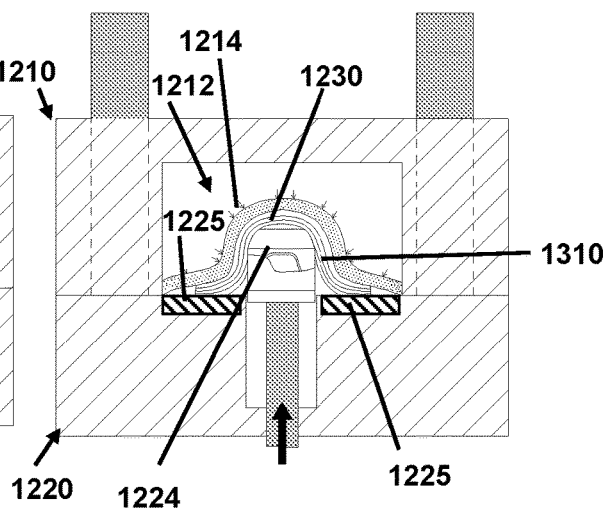
FIG. 13b illustrates a side view of the pressure forming apparatus of FIG. 13b showing the male die element fully extended to push the stack of prepreg layers and the flexible diaphragm or bladder to form stack of prepreg layers into the helmet preform, in accordance with one or more embodiments of the present invention.

FIG. 13b illustrates a side view of the pressure forming apparatus of FIG. 13b showing the male die element 1224 fully extended to push the stack of prepreg layers 1230 and the flexible diaphragm or bladder 1214 to form the stack of prepreg layers into a helmet preform 1310, in accordance with one or more embodiments of the present invention.

The hydroforming forming process is disclosed in Yadav, Ajay, and Taylan Allan. "Processes for Hydroforming Sheet Metal—Part II: Sheet Hydroforming with a Punch." *Stamping Journal* March 2006: 44-45, which is hereby incorporated in its entirety by reference, as a sheet metal forming process developed in the late 1940's and early 1950's to provide a cost effective means to produce relatively small quantities of drawn parts with irregular contours that do not lend themselves to stamping. Virtually all metals capable of cold forming can be hydroformed, including steel, aluminum, brass, copper, titanium, and high temperature alloys. The hydroforming process has the ability to contour sheet metal to complex and irregular shapes, to draw different thickness of material on the same tooling, and to maintain precise tolerances. In hydroforming the tooling cost is typically 50% less expensive than matched die tooling and the draw marks, wrinkling, and tearing associated with matched die forming are eliminated.

Figure 14A:
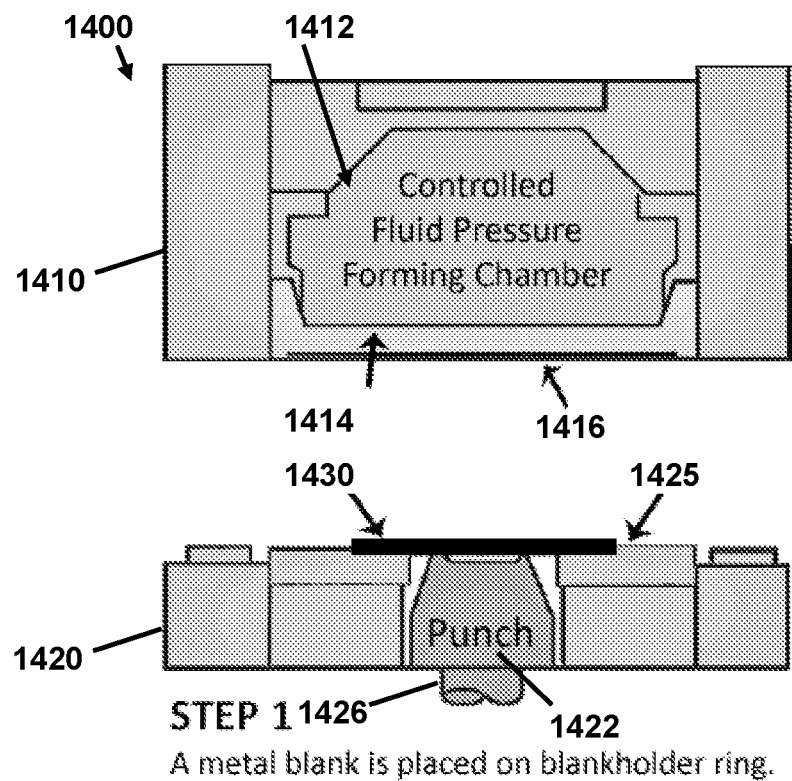
FIG. 14a illustrates a side view of a pressure forming apparatus with a flexible diaphragm or bladder covering a controlled fluid pressure forming chamber in an open position and with metal sheet over a top of a male die element, in accordance with one or more embodiments of the present invention.

FIG. 14a illustrates a side view of a pressure forming apparatus 1400 with a flexible diaphragm or bladder covering a controlled fluid pressure forming chamber in an open position and with a sheet of metal over a top of a male die element, in accordance with one or more embodiments of the present invention. In FIG. 14a, the pressure forming apparatus 1400 is a hydroforming press 1400, which is also known as bag press, bladder press or flexform fluid cell press, employs high pressures ranging from 5,000 to 20,000 psi to form a wide variety of complex shapes at room temperature. It operates with an upper or female die element 1410 that consists of a pressurized forming chamber 1412 of hydraulic oil, a rubber diaphragm or bladder 1414 and a wear pad 1416 on an outer side of the bladder 1414. A lower or male die element 1420 is comprised of a punch 1422 that has the shape and dimensions of the part to be made and a blank holder ring 1425. The punch 1422 is attached to a hydraulic piston 1426 and the blank holder ring 1425 surrounds the punch 1422. In a first step of the hydroform molding process, a blank 1430, which is a sheet of metal blank, is placed on the blank holder ring 1425 to cover the punch 1422

Figure 14B:
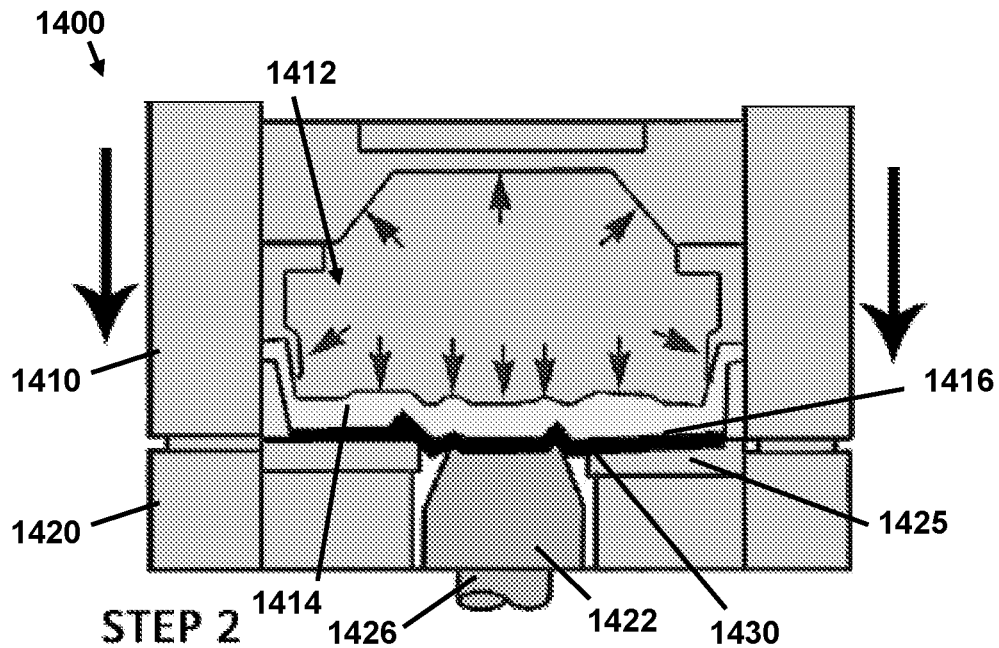
FIG. 14b illustrates a side view of the pressure forming apparatus of FIG. 14a with the flexible diaphragm or bladder covering the controlled fluid pressure forming chamber in a closed position over metal sheet, in accordance with one or more embodiments of the present invention.

FIG. 14b illustrates a side view of the pressure forming apparatus 1400 of FIG. 14a with the flexible diaphragm or bladder 1414 covering the controlled fluid pressure forming chamber 1412 in a closed position over the metal sheet 1430. As seen in FIG. 14b, in a second step of the preform molding process, the flexible die member 1414 and wear pad 1416 have pressed against the blank 1430 and the pressure forming chamber 1412 has been pressurized, which has partially deformed the blank to conform it to the shape of a top of the punch 1422, but without the punch 1422 being moved from its starting position.

Figure 15A:
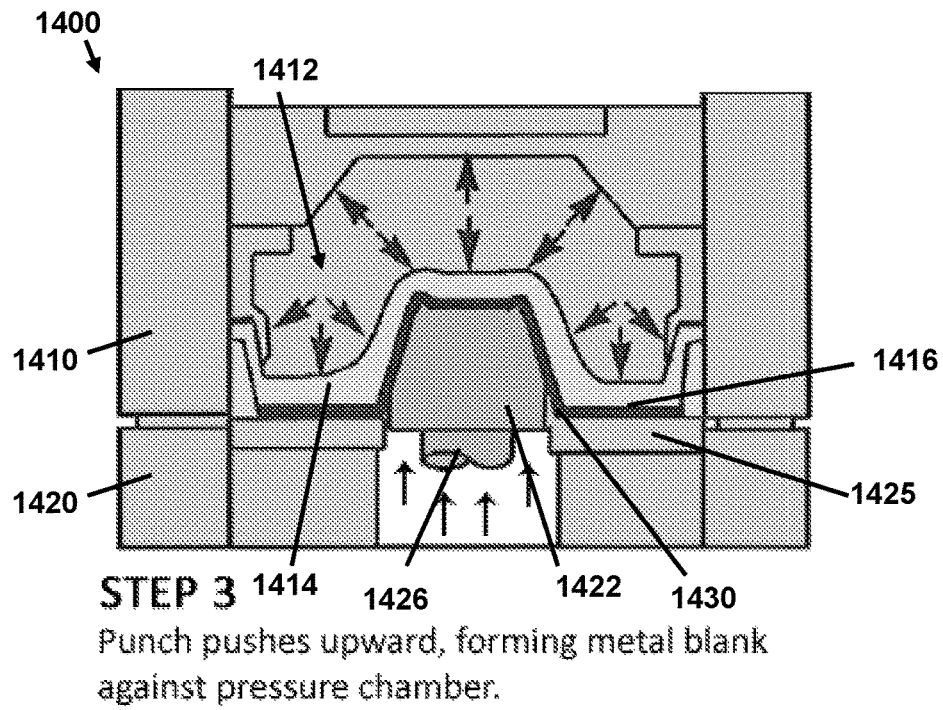
FIG. 15a illustrates a side view of the pressure forming apparatus of FIGS. 14a and 14b showing the beginning of the sheet metal forming process with the male die element beginning to push up against the sheet metal and against the flexible diaphragm or bladder covering the controlled fluid pressure forming chamber, in accordance with one or more embodiments of the present invention.

FIG. 15a illustrates a side view of the pressure forming apparatus of FIGS. 14a and 14b showing the beginning of the sheet metal forming process with the male die element beginning to push up against a sheet metal blank and against the flexible diaphragm or bladder covering the controlled fluid pressure forming chamber, in accordance with the conventional sheet metal forming practice.

Figure 15B:
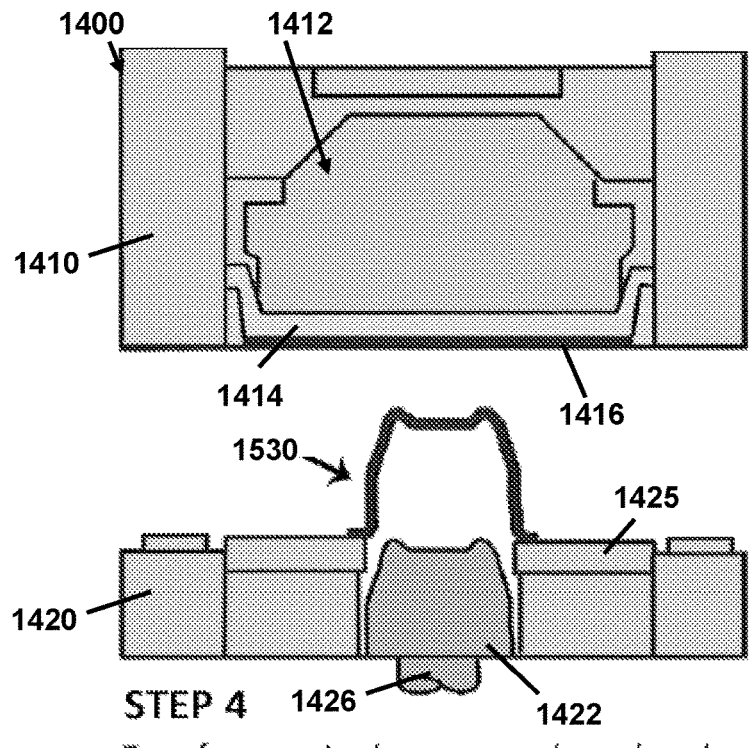
FIG. 15b illustrates a side view of the pressure forming apparatus of FIG. 14b showing the pressure forming apparatus in an open position and the male die element fully retracted away from a sheet metal formed part that was formed from the sheet metal blank and the flexible diaphragm or bladder covering the controlled fluid pressure forming chamber, in accordance with one or more embodiments of the present invention.

FIG. 15b illustrates a side view of the pressure forming apparatus of FIG. 14b showing the pressure forming apparatus in an open position and the male die element fully retracted away from a sheet metal part that was formed from a flat sheet metal blank and the flexible diaphragm or bladder covering the controlled fluid pressure forming chamber, in accordance with conventional sheet metal forming practice using hydroforming.

The hydroforming process begins by placing a metal blank on the ring. The press is closed bringing the chamber with oil down on top of the diaphragm over the blank. The forming chamber is pressurized with oil while the punch is raised through the ring and into the forming chamber. Since the female portion of this forming method is rubber, the blank is formed without the scratches associated with stamping.

The diaphragm while supporting the entire surface of the blank, it forms the blank around the rising punch, and the blank takes on the shape and dimensions of the punch. When the hydroforming cycle is complete, the pressure in the forming chamber is released and the punch is retracted from the finished part 1530.

Hydroforming tools can incorporate cutting edges to eliminate downstream trimming. With quick tool setup and cycle times ranging from one to three minutes, hydroforming is a low-cost sheet metal forming process where virtually any sheet metal from 0.1 mm to more than 16 millimeters (0.004 to 0.63 inches) can be formed at room temperature. In addition, different gauges can be formed on the same tool.

For the purposes of the present invention, the term "0/90 prepreg layer" is used to describe one layer of 0/90 cross-plied uni-directionally oriented high tenacity para-aramid or UHMWPE fibers impregnated with a thermoplastic matrix.

Embodiments of the present invention relate to the manufacturing of helmet preforms with no cut, no seams and no wrinkles from a stack of 0/90 prepreg layers with a controlled orientation of all the 0/90 cross-plied uni-directional prepreg layers throughout the stack, utilizing hydroforming. For example, one embodiment of the method includes, with reference to FIGS. 12a, 12b, 13a and 13b:

Placing a stack of 0/90 prepreg layers 1230 in an oven (not shown) at about 150° F. to 200° F., or, alternatively, between 180° F. and 200° F. for about 20-45 minutes, or, alternatively, 20-30 minutes. The time it takes for the stack of 0/90 prepreg layers 1230 in the oven to reach between 180° F. and 200° F. depends on the total number of prepreg layers.

Removing the stack of 0/90 prepreg layers 1230 from the oven and placing them on the hydroforming blank holder ring 1225 on a lower die 1220 in a hydroforming press 1200.

Closing the hydroforming press 1200 by bringing the upper die 1210 with the flexible rubber diaphragm 1214 over the stack of 0/90 prepreg layers 1230 on the blank holder ring 1225 on the lower die 1220.

Pressurizing the forming chamber 1212 located in the upper die 1210 and in fluid contact with the flexible rubber diaphragm 1214. The forming chamber 1212 is pressurized is by pumping in hydraulic oil prior to and while the male core or punch 1222 is raised through the blank holder ring 1225 and into the forming chamber 1212 to start forming the flat stack of 0/90 prepreg layers 1230. Since ballistic helmet sizes are rated by their inside dimensions, the male core or punch 1224 in the hydroforming press has the shape and dimensions of the inside dimensions of the helmet size being manufactured.

As pressure increases within the diaphragm 1212, the diaphragm 1212, while supporting the entire surface of the stack of 0/90 prepreg layers 1230, forms and shapes the stack of 0/90 prepreg layers 1230 uniformly around the rising punch 1224, and the stack of 0/90 prepreg layers 1230 takes on the shape and dimensions of the punch 1224. Pressures of up to 140 bars (2,000 psi) ensure that a resulting helmet preform 1330 is consolidated with no wrinkles, no cuts and no seams. {Replace reference number 1230 for 1330 in FIG. 13b}

When the hydroforming cycle is complete, the pressure in the forming chamber 1212 is released, the punch 1222 is retracted from the finished helmet preform 1330 and the flexible rubber diaphragm 1214 returns to its rest position. It is often possible to form and trim in a single operation.

Since hydroforming of a stack of 0/90 prepreg layers can be carried out by either hydroforming with a male core or punch or by hydroforming with a die cavity depending on whether a male core (punch) or a female (die) tool will be used to form the helmet preform. In one embodiment of the present invention, a male core or punch is used during hydroforming to stretch the stack of 0/90 prepreg layers against the flexible rubber diaphragm to form the 0/90 prepreg layers uniformly around the rising punch thus eliminating most of all the wrinkles in the helmet preform.

Depending upon the number of prepreg layers in the stack of 0/90 prepreg layers to be shaped, hydroforming to form a stack of 0/90 prepreg layers into a helmet preform can be accomplished in two or three deep draw operations. When two or three hydroforming draw operations are used, the stack of 0/90 prepreg layers are preheated in an oven, for example, between 180° F. and 200° F. for about 20-30 minutes prior to each draw operation. By pre-heating between draws, it facilitates the processing of the stack of 0/90 prepreg layers into a helmet preform as a pre-molding step by enabling matrix resin to flow/conform around the fibers to form a highly consolidated helmet preform with a substantially reduced amount of voids.

It has also been discovered that the ballistic performance of a helmet not only depends on the ballistic properties of the 0/90 prepreg materials; but also depends upon the relative orientation of each 0/90 prepreg layer with respect to each adjacent 0/90 prepreg layer. For the purposes of the present invention, unless otherwise specified, as used herein, a "stack of 0/90 prepreg layers" means many "0/90 prepreg layers" arranged on top of each other with the same 0/90 orientation. Therefore, when the relative orientation of one or more "0/90 prepreg layers" changes within the stack, the change in orientation angle for each "0/90 prepreg layer"

with respect to the neighboring 0/90 prepreg layer will be clearly specified, as well as the number of "0/90 prepreg layers" within a "stack" that have changed their orientation. The effect of the "0/90 prepreg layers" orientation within a stack of "0/90 prepreg layers" in a helmet preform on the ballistic performance of completely molded thermoplastic matrix composite helmets will be shown in Example 6.

For the purposes of the present invention, a "flexible rubber diaphragm" means the elastic and flexible diaphragm, membrane or bladder that is part of the upper die in a hydroforming press. This "flexible rubber diaphragm" also becomes a seal to the forming chamber that is pressurized by hydraulic oil while the male core or punch is raised through the blankholder ring and into the forming chamber to start continuously and uniformly forming the flat stack of 0/90 prepreg layers and draping them around the male core or punch. This impermeable "flexible rubber diaphragm" is made said from commercially available industrial grades of neoprene rubber, rubber elastomers or silicon rubber materials strong enough to withstand high pressures at room temperature for many deep draw forming cycles.

Another benefit of this inventive process is the improvement upon conventional helmet preform pattern designs and assembly techniques by providing the hydroforming process as a novel fabrication method to make highly consolidated helmet preforms with no cut, no seams and no wrinkles. The process can be used with the most advanced thermoplastic matrix composite ballistic materials to create helmets in which there is no overlapping and no seams in each individual 0/90 prepreg layer within the stack to optimize the ballistic performance of molded helmets. The method described herein eliminates the overlapping and seams associated with conventional helmet preform designs and helmet preform manufacturing techniques. This novel fabrication technique allows a flexible rubber diaphragm to continuously and uniformly apply pressure to a flat stack of 0/90 prepreg layers to form a well consolidated helmet preform with no overlaps and no seams during all stages of the deep draw operation at room temperature.

It should also be understood that while the inventive processes, fabrication techniques and examples described herein are discussed in relation to existing materials and helmet designs, the inventive processes and fabrication techniques can be used with next generation and/or non-traditional materials, fabrics, uni-directional prepregs, and 3 dimensional fiber structures, for example, but not limited to, polypropylene, polyethylene, and para-aramid fibers, to manufacture current as well as alternative helmet geometries.

FIG. 16 shows top perspective views of the prepreg layers at the three different stages in the molding process shown in FIGS. 12a, 12b, 13a and 13b, in accordance with one or more embodiments of the present invention. Specifically, in FIG. 16, a partially formed helmet preform 1610 is shown extending upward from the stack of 0/90 prepreg layers after, for example, a first partial advance of the punch. It is also shown that the middle of each of the edges of the stack of 0/90 prepreg layers 1612 is beginning to be pulled toward the center of the stack of 0/90 prepreg layers 1612. In the middle picture, an intermediately formed helmet preform 1620 is shown extending even further upward from the stack of 0/90 prepreg layers after, for example, a second longer advance of the punch. It is further shown that the middle of each of the edges of the stack of 0/90 prepreg layers 1622 is being pulled to an even greater extent toward the center of the stack of 0/90 prepreg layers 1622. In the bottom picture, a fully formed helmet preform 1630 is shown extending even further upward from the stack of 0/90 prepreg layers after, for example, a full advance of the punch. It is further shown that the middle of each of the edges of the stack of 0/90 prepreg layers 1632 is now fully pulled toward the center of the stack of 0/90 prepreg layers 1632. The images in FIG. 16 are merely provided to illustrate the stages of formation of a helmet using the inventive process and should not be construed as limiting the process a specific number of steps.

Another benefit of the various embodiments of the present invention is providing an improvement upon conventional helmet preform assembly techniques by a novel hydroforming fabrication method to make highly consolidated helmet preforms with the most advanced thermoplastic matrix composite ballistic materials in which each individual 0/90 prepreg layer is laid out with controlled orientation to optimize the ballistic performance of molded helmets. Specifically, the method of the present invention is directed to a novel fabrication technique that allows a flexible rubber diaphragm to continuously and uniformly apply pressure to a stack of 0/90 prepreg layers to form a well consolidated helmet preform while maintaining the relative orientation among all the individual 0/90 prepreg layers within a stack during all stages of the deep draw operation at room temperature.

Another benefit of the various embodiments of the present invention is providing a novel fabrication technique that allows a flexible rubber diaphragm to continuously and uniformly apply pressure to a stack of 0/90 prepreg layers to form a well consolidated helmet preform in less than two (2) minutes per draw operation at room temperature. Having the flexible rubber diaphragm not being exposed to temperature cycling of heating and cooling during the deep draw operations of helmet preforms affects the durability/life of the flexible rubber diaphragm, hence the cost of manufacturing helmet preforms.

Another benefit of the various embodiments of the present invention is providing a novel and simplified hydroforming fabrication method to make highly consolidated helmet preforms with the most advanced thermoplastic matrix composite ballistic materials using pressures of about 200 to about 2500 psi during each deep draw operation at room temperature, or, in some embodiments, about 800-1200 psi. Specifically, the method described herein is a novel fabrication technique that allows a flexible rubber diaphragm to continuously and uniformly apply about 800-1200 psi of pressure to a stack of 0/90 prepreg layers to form a well consolidated helmet preform in less than two (2) minutes per deep draw operation at room temperature.

A further benefit of the various embodiments of the present invention is to provide a simplified fabrication method to make a highly consolidated helmet preforms with the most advanced thermoplastic matrix composite ballistic materials starting with a flat stack of 0/90 prepreg layers. The method described herein is the first step of a simplified fabrication technique in which each of the 0/90 prepreg layers in a stack is arranged with a specific relative orientation angle from each other which is maintained during all stages of the deep draw operation at room temperature.

Plus/Plus Helmet Preform Design

For the purposes of this invention, in some of the examples a helmet preform design termed "plus/plus" has been used. The plus/plus helmet preform design preceded the invention of the helmet preform design with no-cuts and no-seam made by hydroforming that we coined the "Solid Design". The examples where the Plus/Plus preform design is used are included herein to illustrate the importance on the ballistic performance of the molded helmets of the relative fiber orientation between adjacent or neighboring 0/90 prepreg layers throughout the helmet preform and of the less number of cuts or seams during the process of putting together or assembly of a helmet preform.

Figure 17:
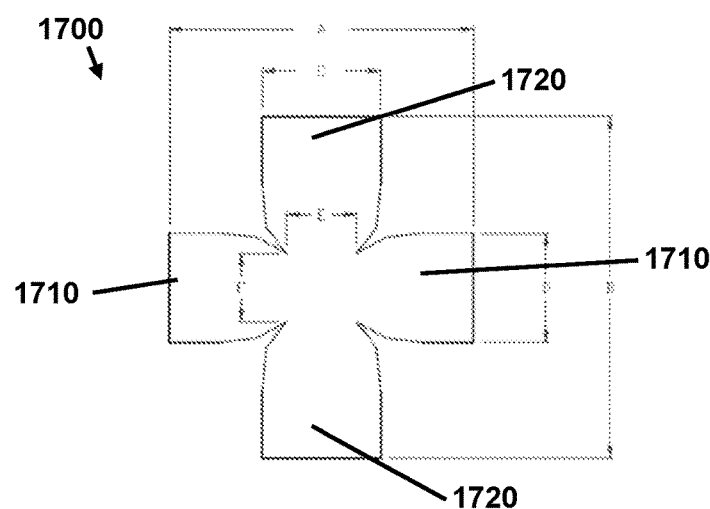
FIG. 17 is a plan view of a plus/plus helmet preform pattern design, in accordance with one or more embodiments of the present invention.

FIG. 17 is a plan view of a plus/plus helmet preform pattern design 1700, in accordance with one or more embodiments of the present invention. In FIG. 17, plus/plus helmet preform design 1700 is provided for making a ballistic resistant thermoplastic matrix composite helmet formed from a stack of 0/90 prepreg layers using the plus/plus pinwheel/rosette pattern design that increases the overall ballistic performance by eliminating petal 1710, 1720 overlap and adjusting the fiber orientation between adjacent or neighboring 0/90 prepreg layers.

One benefit of the various embodiments of the present invention relates to an improved preform design for shaping a helmet preform from a stack of 0/90 prepreg layers in which said prepreg layers using the plus/plus pinwheel/rosette pattern design 1700 to adjust the fiber orientation between adjacent or neighboring 0/90 prepreg layers on the crown area and on the sides of the helmet by cutting the plus/plus pinwheel/rosette pattern 1700 as shown in FIG. 17. During the tracing and cutting of multiple plus/plus pinwheel/rosette patterns, all the pinwheel/rosette patterns keep the same fiber orientation; but each pinwheels/rosette patterns is cut with a rotation between 15° to 25°, for example, in one embodiment, between 15° to 20°, from each other in an increasing sequence of rotation angles, as shown in FIG. 18.

Figure 18:
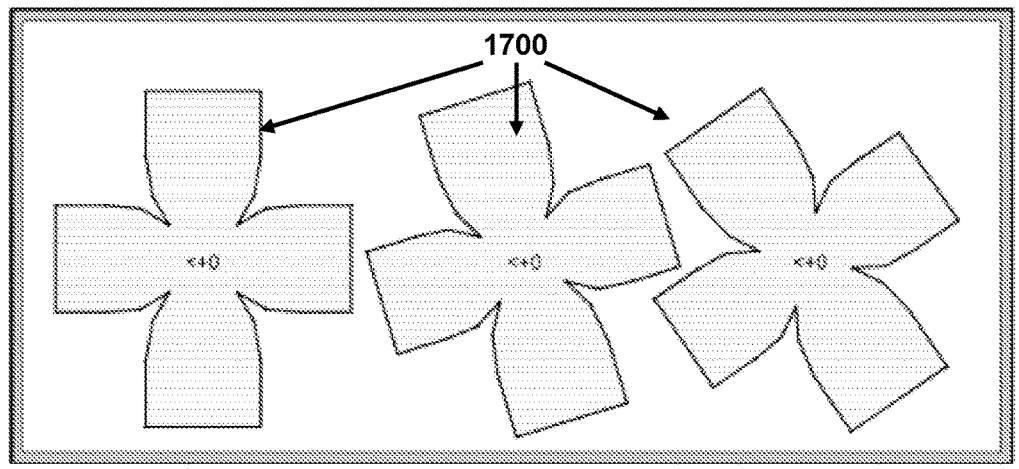
FIG. 18 is a plan view of a tracing and cutting layout for the plus/plus helmet preform pattern design of FIG. 17 from a uni-directional thermoplastic prepreg material with offsets, in accordance with one or more embodiments of the present invention.

FIG. 18 is a plan view of a tracing and cutting layout for the plus/plus helmet preform pattern design 1700 of FIG. 17 from a uni-directional thermoplastic prepreg material with offsets, in accordance with one or more embodiments of the present invention.

During the preform assembly, all the plus/plus pinwheel/rosette patterns 1700 are laid out in the crown area with all the fibers oriented at 0° from each adjacent or neighboring 0/90 prepreg layer and on the sides of the helmet, the fibers are laid out with preferred change of orientation of 15° to 20° between adjacent or neighboring 0/90 prepreg layer to accommodate the staggering of the seams. The tracing, cutting and assembly of the plus/plus pinwheel/rosette patterns 1700 were made to achieve a uniform areal density of the molded helmet shell by eliminating the preform petals overlap and duplicates the same number of layers in the molded helmet shell as a flat panel with the same areal density.

The overlap of the plus/plus pinwheel/rosette patterns 1700 is thus eliminated by the shape and dimensions of the plus/plus pinwheel/rosette pattern design shown in FIG. 17. The fiber orientation on the sides of the helmet is controlled by staggering the rotation of the seam of each plus/plus pinwheel/rosette pattern 1700 by 15° to 20° in an increasing sequence between adjacent or neighboring 0/90 prepreg layers. Since each pinwheels/rosette pattern is marked during cutting with its own orientation angle, the assembly of the helmet preform is facilitated by aligning each plus/plus pinwheel/rosette pattern with the 0° orientation of the fibers at the crown, while each plus/plus pinwheel/rosette pattern is laid down sequentially with its own 15° to 20° rotation provided during cutting.

Structural Composite Helmet Skin.

Figure 2:
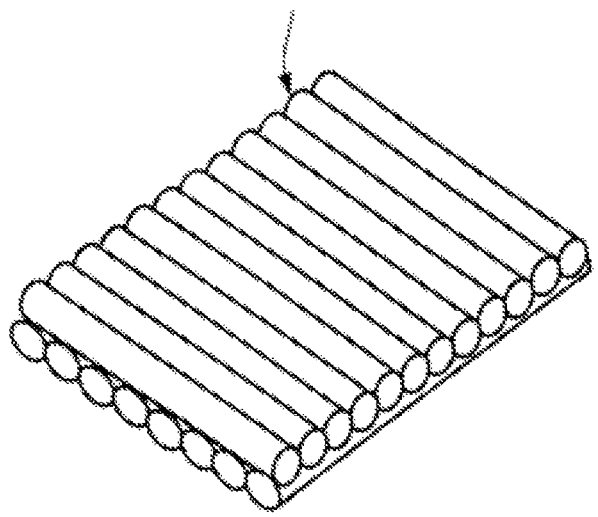
FIG. 2 illustrates a perspective view of a Uni-directional 0/90 fabric construction used in prior art helmet systems.
Figure 8:
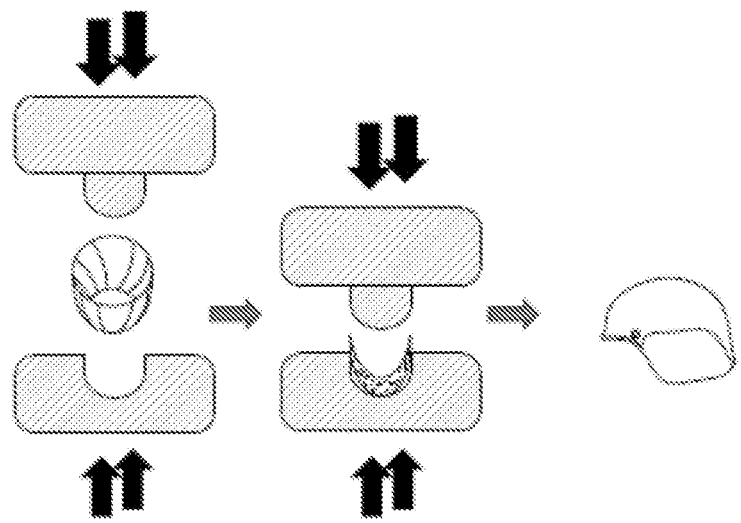
FIG. 8 illustrates a prior art compression molding process for ballistic helmets.
Figure 9:
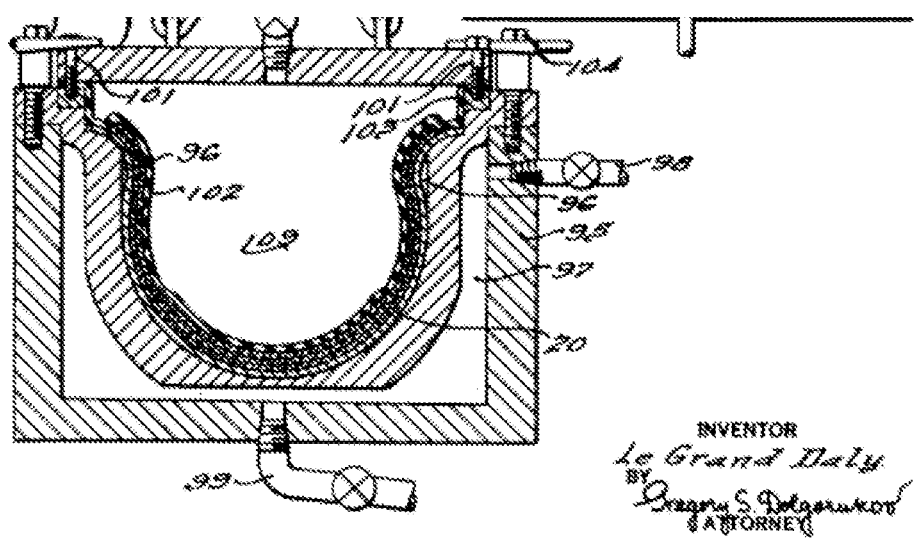
FIG. 9 illustrates FIGS. 17 and 18 from U.S. Pat. No. 2,420,522.
Figure 10:
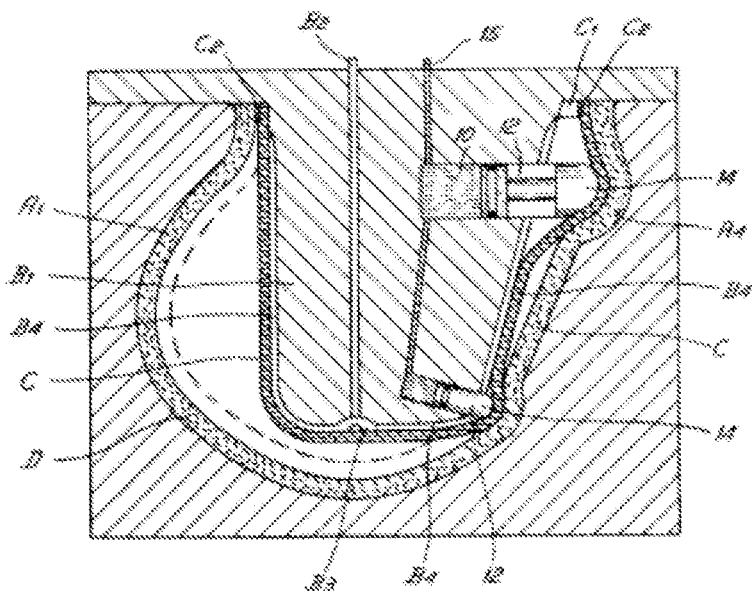
FIG. 10 illustrates FIG. 3 from U.S. Pat. No. 4,338,070.
Figure 11:
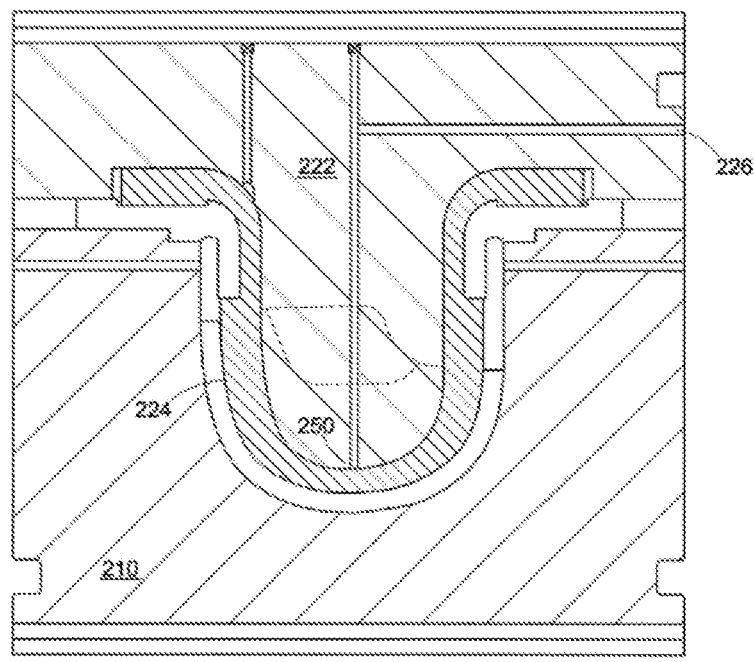
FIG. 11 illustrates FIG. 3 from International PCT patent publication number WO 2010/019697.

For the purposes of the present invention, the thermoplastic matrix composite materials used herein are made of 0/90 cross-plied uni-directionally oriented high tenacity para-aramid fibers or high-drawn high tenacity Ultra High Molecular Weight Polyethylene (UHMWPE) fibers impregnated or coated with a thermoplastic matrix resin as shown, for example, in FIG. 2. A benefit of this design is that the thermoplastic matrix composite materials are known to provide a more compliant composite laminate. Therefore, hybrid helmet designs using the new ballistic thermoplastic matrix composite materials need structural composite skins to enhance their compression, impact, trauma and durability limitations. To mold ballistic helmets from this new class of materials, a forming process for thermoplastic matrix composites is required to mold a helmet preform with structural composite materials as a skin placed either in the inside surface, outside surface or both surfaces of the molded helmet.

For the purposes of the present invention, the term "structural composite skin" is used to describe a stack of 0/90 cross-plied uni-directionally oriented high tenacity carbon fibers impregnated with thermoset epoxy, polyester or vinylester matrix. In accordance with one or more embodiments of the present invention, a "structural composite skin" includes one or two layers of woven fabric made from high tenacity para-aramid fibers and impregnated with PVB-phenolic resin. The para-aramid fabric layers are placed on the outer most outside layers on the surface of the helmet preform to be in contact with the steel dies during the high temperature cycle of the helmet molding operations.

In accordance with one or more embodiments of the present invention, a method of manufacture includes forming, shaping or draping the structural composite skin materials separately on a helmet shape male core, punching or mandreling by hydroforming where the flexible rubber diaphragm continuously and uniformly applies pressure to the stack of structural composite skin materials to form a well consolidated helmet preform insert in less than two (2) minutes during a deep drawing operation at room temperature.

In accordance with one or more embodiments of the present invention, a method of manufacture includes forming, shaping or draping the structural composite skin materials separately on a helmet shape male core (punch or mandrel), by applying pressure by hand continuously and uniformly to the stack of structural composite skin materials to form and consolidate the helmet preform insert at room temperature.

For the purposes of the present invention, the term "helmet preform insert" used herein for the "structural composite skin materials" means that the pre-shaped "structural composite skin materials" is incorporated or installed during the last hydroforming draw operation of the helmet preform making process or as an intermediate step during the high temperature cycle of the helmet molding operations.

In accordance with one or more embodiments of the present invention, a method of manufacture includes making the "structural composite skin materials" using the standard compression molding process with matched steel dies into a hard thermoset composite matrix shell that is incorporated or installed as an insert placed inside of the female helmet die cavity and held in place by vacuum during the high temperature cycle of the helmet compression molding operations.

In accordance with one or more embodiments of the present invention, a method of manufacture includes making the "structural composite skin materials" using the standard compression molding process with matched steel dies into a hard thermoset composite matrix shell that is incorporated or installed during a hydroforming step after the high pressure molding operation of the helmet molding process.

One example of the materials used for the production of the "structural composite skin" according to the present invention are a material made of 0/90 cross-plied uni-directionally oriented high tenacity carbon fibers impregnated with epoxy, polyester or vinylester thermoset matrix. As used herein, the term "high tenacity carbon fibers" means yarns which have tenacity at least about 23 g/d, a modulus of at least about 500 g/d and an energy-to-break of at least about 30 J/g. For example, uni-directional carbon fiber epoxy prepreg made by Park Aircraft Technologies Corporation, Newton, Kans., Cytek, JD Lincoln and Lewcott to name a few are particularly useful in molding the structural composite skin to structurally reinforce thermoplastic matrix composite ballistic helmets.

Another example of the materials used for the production of the "structural composite skin" according to the present invention are a material made of woven fabrics made with high tenacity para-aramid fibers impregnated with PVB-phenolic thermoset matrix. As used herein, the term "high tenacity para-aramid fibers" means yarns which have tenacity at least about 23 g/d, a modulus of at least about 500 g/d and an energy-to-break of at least about 30 J/g. For example, Twaron® T2000 from Teijin Corporation and Kevlar® 129 or Kevlar® KM2 from DuPont de Nemours are particularly useful in molding the composite skin to structurally reinforce thermoplastic matrix composite ballistic helmets.

For the purposes of the present invention, the number of 0/90 carbon prepreg layers comprising the structural composite skin depends on the level of stiffness needed to be increased to meet the structural specification for a particular ballistic helmet design. As an example, for the US Army Light Weight ACH or ECH helmets, one embodiment for the structural composite skin materials can include two to four 0/90 prepreg layers of uni-directional 24" E-765 T700 carbon epoxy made by Park Aircraft Technologies Corporation, Newton, Kanas, plus two layers of 850 denier KM2/PVB-phenolic weighs 30.0 oz/yd2 (1.0 kg/m2).

In accordance with one or more embodiments of the present invention, a method of manufacture includes using an adhesive film between the structural composite skin and the thermoplastic matrix composite ballistic helmet shell to provide a strong bonding between the two composite matrix materials and to reduce the delamination between the two different matrix composite materials.

Molding of Thermoplastic Matrix Composite Ballistic Helmets

One of the most common technologies for the fabrication of ballistic helmet shells is commonly known as compression molding, where the helmet shells are molded using matched metal dies from a stack of woven fabric blanks/prepreg of para-aramid fibers impregnated with 14%-20% by weight PVB-phenolic matrix resin. The stack of blanks soaked with resin is pressed in a mold at about 30-40 Kg/cm² pressure at 300° F.-350 OF temperature One aspect of this invention relates to the conventional compression molding method being used with the most advanced thermoplastic matrix composite ballistic materials to demonstrate the superior ballistic performance of molded helmets as a function of the helmet "Solid Preform Design,", The benefit of using a stack of 0/90 cross-plied uni-directional UHMWPE fibers thermoplastic matrix prepreg layers is described below in Example 1, which compares the ballistic performance of helmets made with three different preform designs, i.e., the prior art pinwheel, plus/plus pinwheel/rosette and Solid designs.

Conventional compression molding process using matched metal dies comprises the steps of:

a) Placing a helmet preform previously made in the pre-molding step from a stack of 0/90 cross-plied uni-directional para-aramid or UHMWPE fibers thermoplastic matrix prepreg layers on the lower die of a matched metal dies compression molding press that is heated at about 250° F. to 350° F., or, in some embodiments, at about 260° F. to 270° F., depending upon the properties of the fibers and the matrix resin of the prepreg materials.

b) Closing the compression molding press by bringing down the upper die until the dies close by applying pressures between 500 psi to 5000 psi, or, in some embodiments, at about 1500 psi to 3000 psi for 15 to 25 minutes, or, in some embodiments, at about 15-20 minutes, at constant dies temperatures between 250° F. to 350° F., or, in some embodiments, at about 260° F. to 270° F.

c) After the 15-20 minutes during the high temperature molding cycle, the dies cools down from about 260° F. to 270° F. down to about 100° F. to 180° F. of temperature, in around 20 minutes. Pressures of about 1500 psi to 3000 psi is continuously applied during the cooling down cycle. Once the dies temperature has reached 100° F. to 180° F. of temperature, the molded thermoplastic matrix helmet is removed.

d) Once the molded helmet shell is removed, the dies are heated back up again to about 260° F. to 270° F. to start the molding cycle of a new helmet. Heating the dies back up to about 260° F. to 270° F. takes another 15-20 minutes. In total, a complete molding cycle for a thermoplastic matrix composite helmet by the conventional compression molding method could take from 45 minutes up to 60-75 minutes, depending upon the heating and cooling design of the matched metal molds.

Another benefit of the various embodiments of the present invention relates to a novel (innovative) fabrication method to press highly consolidated helmet preforms with no cut, no seams and no wrinkles that can be used with the most advanced thermoplastic matrix composite ballistic materials to reduce the molding cycle time of a thermoplastic matrix composite helmet without affecting their ballistic performance. This innovative fabrication method has been termed a "Short Cycle Molding Method" and consists of using a combination of matched metal dies compression molding during the high temperature heating cycle of the molding process and high pressure molding by hydroforming during the solidification and cooling cycle of the molding process.

In accordance with various embodiments of the present invention, the Short Cycle Molding Method includes the steps of:

a) Placing a helmet preform previously made in the pre-molding step from a stack of 0/90 cross-plied uni-directional para-aramid or UHMWPE fibers thermoplastic matrix prepreg layers on the lower die of a match metal dies compression molding press that is heated at about 250° F. to 350° F., or, in some embodiments, at about 260° F. to 270° F., depending upon the properties of the fiber and matrix resin of the prepreg materials.

b) Closing the compression molding press by bringing down the upper die until the dies close by applying pressures between 500 psi to 5000 psi, or, in some embodiments, at about 1500 psi to 3000 psi for 15 to 25 minutes, or, in some embodiments, at about 15-20 minutes, at constant dies temperatures between 250° F. to 350° F., or, in some embodiments, at about 260° F. to 270° F.

c) After the 15-20 minutes of high temperature molding cycle, the compression molding press opens and the molded thermoplastic matrix helmet is removed and placed over the helmet shaped male core or punch of the hydroforming press.
d) Closing the hydroforming press by bringing the upper die with the flexible rubber diaphragm over the molded thermoplastic helmet. The method described herein is a novel fabrication technique that allows a flexible rubber diaphragm to continuously and uniformly applied pressures up to 20,000 psi, or, in some embodiments, at about 10,000 psi, to a molded thermoplastic matrix composite helmet while the thermoplastic matrix of the molded helmets solidifies and cools down from at about 260° F. to 270° F. down to about 100° F. to 180° F. of temperature, in less than two minutes. Pressures up to 700 bars (10,000 psi) applied continuously and uniformly by the flexible rubber diaphragm on the molded helmet ensure that the thermoplastic matrix of the molded helmet is consolidated and densified to more than 99% of theoretical relative density.
e) When the hydroforming cycle is complete, the pressure in the forming chamber is released, the flexible rubber diaphragm returns to its rest position, and the highly consolidated thermoplastic matrix composite helmet is removed from the hydroforming press. In total, a complete molding cycle for a thermoplastic matrix composite helmet by the Short Cycle Molding method could take from 18 minutes up to 20 minutes, hence becoming a true low cost manufacturing process for thermoplastic matrix composite helmets.
f) Once the molded helmet has cool down to room temperature, it is trim to final dimensions and it is ready for the finishing operations that include drilling holes, painting, rubber edging and installing a suspension system and pads.

For the purpose of this invention, the molding method referred as the "Short Cycle Molding Method" includes an innovative fabrication method for molding uni-directional para-aramid or UHMWPE fibers thermoplastic matrix resin composite helmet preforms using a combination of match metal dies compression molding during the high temperature heating and high pressure by hydroforming during the solidification and cooling of the already molded helmet shell, requires that the match metal dies compression molding equipment is located side-by-side to the high pressure by hydroforming to make it possible, since the time it takes to remove the molded helmet from the compression molding cycle and place it over the male punch in the hydroforming press, it should not take more than 10-20 seconds. Otherwise, pre-heating of the molded thermoplastic helmet shell is necessary before the high pressure by the hydroforming operation takes place, which is the case of the molding process referred as "Standard High Pressure Molding Method".

In accordance with one or more embodiments of the present invention, a method of manufacture includes molding a thermoplastic composite helmet from a helmet preform with no cuts, no seams and no wrinkles utilizing the match metal dies compression molding process to provide the helmet with excellent surface finish and controlled dimensions, particularly controlled wall thickness. Since match metal dies compression molding can be carried out using either a male core (punch) or a female die cavity to place/position the helmet preform. For example, in some embodiments, the helmet preform is placed on top of the male core or punch because the helmet preform is being stretched or placed under tension while the upper female mold cavity closes around the molded helmet preform thus eliminating most of all the wrinkles in the helmet preform.

In accordance with one or more embodiments of the present invention, a method of manufacture includes optionally preheating in an oven the thermoplastic matrix composite helmet preform with no cuts, no seams and no wrinkles from about 200° F. to 250° F. or about 230° F. to 250° F. temperature, as a separate operation prior to compression molding to reduce the time during the high temperature compression molding step.

It has also been discovered that the ballistic performance of a thermoplastic matrix composite helmet not only depends on the ballistic properties of the 0/90 prepreg materials, the relative orientation of each 0/90 prepreg layer with respect to each adjacent 0/90 prepreg layer, and the preform patterns with no cuts and no seams; but also, depends upon the high pressure uniformly applied to the helmet during the solidification and cooling part of the molding cycle within a short period of time. For the purposes of the present invention, pressures up to 700 bars (10,000 psi) applied continuously and uniformly by the hydroforming flexible rubber diaphragm on the molded helmet ensure that the thermoplastic matrix of the molded helmet is consolidated and densified while the thermoplastic matrix is still soft or in a liquid state by allowing the resin matrix to flow and, within a very short period of time of less than two (2) minutes, the thermoplastic matrix change to a solid state, lending hydroforming as an innovative molding process for an economical and cost competitive molding process suitable for volume manufacturing of thermoplastic matrix composite ballistic helmets.

U.S. Pat. Nos. 2,420,522, 2,423,076, 2,532,442 and 2,451,483 disclose the production of ballistic helmet shells where flexible rubber diaphragm are used to applied high pressure uniformly during molding a helmet, always maintaining high pressures in contact with the flexible rubber diaphragm throughout the entire molding process, and they are hereby incorporated by reference in their entireties. They also disclose that the cooling of the helmet being molded is done after the heating or curing of the helmet inside the same machine or equipment. It has also been discovered as part of this invention, that the prior art molding cycle requires hours and not minutes, as in embodiments of the present invention, for molding each single thermoplastic matrix composite helmet making it extremely expensive and impractical molding process for volume manufacturing.

It has also been discovered that the hours it takes for the prior art molding cycles for each single thermoplastic matrix composite helmet using flexible rubber diaphragm are used to uniformly applied high pressure during molding a helmet, stems from the facts that the heat transfer through the flexible rubber diaphragm is very slow, and both the metal mold cavity and the hydraulic oil need to be heated up and cooled down each time a helmet is molded. Therefore, the life of current commercially available flexible rubber diaphragms or bladders is very short when subjected to the heating and cooling thermal fatigue cycles under the very high pressures required for molding helmets.

It has further been discovered that the innovative molding process provided as part of this invention takes advantage of the practical aspects of matched metal dies of compression molding combined with the practical aspects of hydroforming making this innovative molding process fast and economical because neither the metal dies during the compression molding cycle, nor the dies and flexible rubber diaphragm during hydroforming are under a heating and cooling cycling mode. The metal dies during the compression molding cycle are always at high temperature and the punch/core and flexible rubber diaphragm during hydroforming are always at room temperature.

The practical aspects from match metal dies compression molding include: excellent surface finish and controlled dimensions, particularly controlled wall thickness of the helmet being molded provided by the matched metal dies; and keeping the dies temperature constant during the high-temperature cycle of the helmet molding operations.

The practical aspects of hydroforming include: applying a very high pressure continuously and uniformly on the molded helmet by the flexible rubber diaphragm; and applying a very high pressure continuously and uniformly on the molded helmet by the flexible rubber diaphragm at room temperature in less than two minutes. The cooling of the thermoplastic matrix composite helmet during the high pressure cycle is provided by the heat transfer through the male core or punch while the flexible rubber diaphragm works as an insulating element.

Ballistic Performance of Thermoplastic Matrix Composite Ballistic Helmets

The examples presented here include details about the materials, helmet preform designs, molding conditions and ballistic performance data to provide a better understanding of the invention. These examples are included to help illustrate the principles of the invention and should not be construed as limiting the scope of the invention.

The present invention provides a novel manufacturing method that allows the use of advance thermoplastic matrix composite materials to fabricate very high ballistic performance helmets including: a) using a hydroforming deep draw process for forming and consolidating a helmet preform with no-cuts, no-seams, and controlled fiber orientation throughout the helmet; b) using a conventional compression molding process to demonstrate the ballistic performance of thermoplastic matrix composite helmets as a function of the helmet preform design and; c) using a hydroforming process to establish a short cycle molding method by applying high pressure uniformly to the helmet during the solidification and cooling part of the molding cycle within a short period of time of less than two (2) minutes.

Figure 16A:
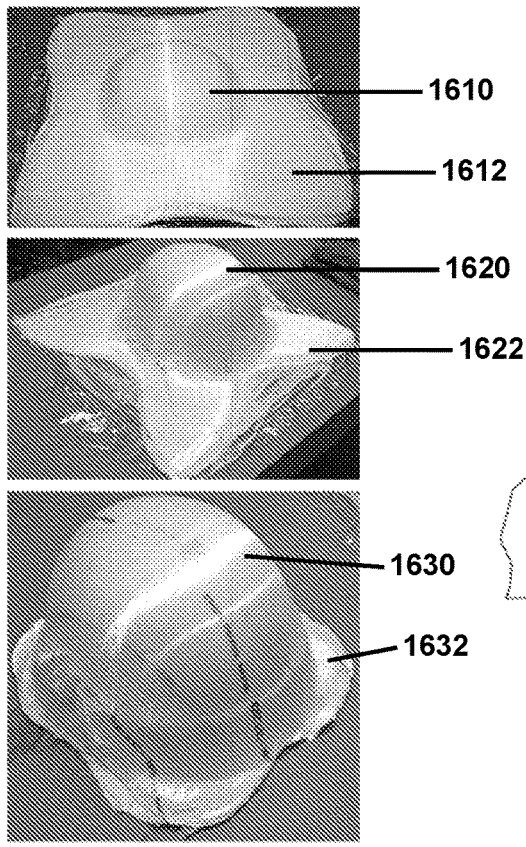
FIG. 16a shows top perspective views of the prepreg layers at different times in the molding process shown in FIGS. 12a, 12b, 13a, 13b, in accordance with one or more embodiments of the present invention.
Figure 16A:
Figure 16A:
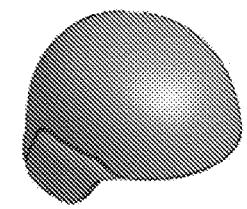
Figure 16A:
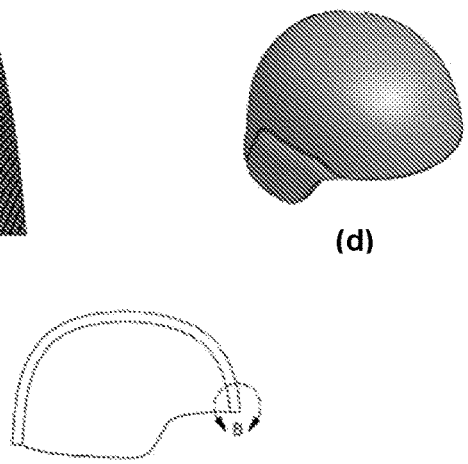

For the purposes of the present invention, the US Army Advanced Combat Helmet (ACH) is used as a reference for a helmet shell design, helmet weight and helmet ballistic performance, see, for example, FIG. 16b. The ACH helmet evolved with minor changes from the existing PASGT (Personnel Armor System Ground Troop) helmet shape with an areal density of approximately 323 oz/yd$^2$ (2.24 psf) being manufactured using a para-aramid fabric coated with the same thermoset Polyvinyl Butyral (PVB)-phenolic resin. The ACH helmet is currently made with a wall thickness of 8.13 mm (0.320") from 1500 denier Kevlar® 129 or Twaron T2000 yarns in a 2×2 basket fabric construction that weighs 12.0 oz/yd$^2$ (408 g/m$^2$). The fabric is impregnated with 12-14% by weight of Polyvinyl Butyral (PVB)-phenolic resin. The helmets are fabricated by assembling a helmet preform using 25-27 equivalent layers of prepreg. As in the PASGT helmet, the layers in the ACH preform are then compression molded at constant temperature and rather substantial compression pressures using self-trimming matched metal molds at a rate of one helmet every 12-15 minutes.

The ballistic requirements for the ACH described in the Product Description (PD) of the helmet include the $V_{50}$ ballistic protection limits, $V_{50}$ BL (P), and the Back Face Deformation (BFD) against 9 mm FMJ bullet.

TABLE 2

ACH First Article Ballistic Testing Requirements.

| RCC & Fragment Simulator Projectiles (FSP), grains | ACH Ballistic Limit, V50 (ft/s), Minimum |
|---|---|
| 2 | 4075 |
| 4 | 3450 |
| 16 | 2425 |
| 64 | 1700 |
| 17 | 2200 |
| 9 mm RTP/BFD | 1400 + 50, no pentration |

In addition, one of the ACH structural requirements is to meet the side-to-side ASTM D-76 Compression Test. The test procedure includes placing the helmet in a 2.5" flat loading anvil, centering the helmet on the widest part of helmet shell, compressing the shell at a rate of 12 inch/min until 300 lbs are reached, and releasing the load down to 5 lbs and repeating this loading cycle for another 24 times. After the loading cycle, measure the change in dimension to be less than 0.125" immediately after the 25 loading cycles (within 5 minutes) and to be less than 0.100" after 24 hours. This test is performed on shells conditioned at room temperature and humidity.

For the purposes of example, the medium size ACH is selected. To fabricate medium size ACH helmet shells with the same weight of 2.24 lbs/ft$^2$ areal density using the state of the art thermoplastic matrix composite materials, the tooling for the compression molding dies has to be re-designed to take into consideration or account for the lower areal density of the new uni-directional UHMWPE composite materials. For the uni-directional UHMWPE composite materials selected in these examples, the new helmet wall thickness needed was estimated to be between 10.16 mm and 11.43 mm (0.400 inches and 0.450 inches), or, more specifically for this example, 10.92 mm (0.430 inches). The system and method of the present invention can also be used to produce very thin helmets.

For the purposes of this example, the thermoplastic matrix uni-directional UHMWPE composite ballistic materials selected include Spectra Shield SR-3130, Dyneema HB-26 and Dyneema HB-80, as listed below in Table 3.

As a starting point for molding helmet shells, the number of layers for each thermoplastic matrix composite material is estimated based on a 2.24 lbs/ft2 flat panel areal density and the area density of each prepreg composite material. For example, it would require 41.6 layers of UHMWPE Spectra Shield SR-3130, 39.6 layers of Dyneema HB-26 or 77.2 layers of Dyneema HB-80 to press or mold flat panels with 2.24 lbs/ft2 of areal density. The system and method of the present invention can also be used to produce helmets with a areal density as high as 3.0 lbs/ft2 and as low as 1.65 lbs/ft2.

TABLE 3

Uni-directional UHMWPE Thermoplastic Matrix Composite Materials.

| | Thermoplastic Matrix Composite Helmet 0/90 Prepreg Materials | | |
|---|---|---|---|
| | Spectra Shield SR-3130 | Dyneema HB-26 | Dyneema HB-80 |
| Helmet Area Density, psf (oz/yd2) | 2.24 | 2.24 | 2.24 |
| Helmet Wall Thick- | 10.92 (0.430) | 10.92 (0.430) | 10.92 (0.430) |

TABLE 3-continued

Uni-directional UHMWPE Thermoplastic Matrix Composite Materials.

| | Thermoplastic Matrix Composite Helmet 0/90 Prepreg Materials | | |
|---|---|---|---|
| | Spectra Shield SR-3130 | Dyneema HB-26 | Dyneema HB-80 |
| ness, mm (inches) Fiber | UHMWPE | UHMWPE | UHMWPE |
| Fiber Construction/Prepreg | 0/90 | 0/90 | 0/90 |
| Prepreg Weight, g/m2 (oz/yd2) | 263 (7.75) | 276 (8.14) | 142 (4.18) |
| Thermoplastic Prepreg Matrix Resin | PU | PU | PU |
| Number of Layers/Flat Panel | 41.6 | 39.6 | 77.2 |

In addition to the helmet thermoplastic matrix ballistic composite materials selected and the estimated helmet shell wall thickness, a structural skin has been incorporated to meet the ASTM D-76 Compression Test because all the thermoplastic matrix materials are lower in both flex strength and stiffness.

TABLE 4

Carbon epoxy 0/90 carbon epoxy prepreg materials for structural helmet skin materials.

| | Structural Helmet Skin Materials | | |
|---|---|---|---|
| | IM7/381 | EP255-3K | C24T700150 |
| Fiber | Carbon | Carbon | Carbon |
| Fiber Construction/Prepreg | 0/90/0/90 | 0/90 | 0 tape |
| Prepreg Weight, g/m2 (oz/yd2) | 448 (13.0) | 194 (5.7) | 117 (3.44) |
| Thermoset Prepreg Matrix Resin | Epoxy | Epoxy | Epoxy |
| Manufacturer | Cytec | Lewcott | Park Aircraft |

For the purposes of this invention, among commercially available carbon-epoxy prepreg materials that can be used as structural helmet skin include, but are not limited to, IM7/381 manufactured by Cytec Engineering Materials, EP255-3K made by Lewcott Corp., Millbury, Mass., and C24T700150 made by Park Aircraft Corporation, as shown in Table 4. All carbon-epoxy prepreg materials are commercially available, had compatible low temperature (250° F.) cure requirements and provided very high flexural stiffness once cured. Chemical compatibility with the class of thermoplastic resins used in the ballistic layers was confirmed by simply molding flex bars and visually inspecting for resin migration and performing short beam shear tests to confirm adequate inter-laminar adhesion between ballistic core and structural skin.

For the purpose of this invention, in certain cases a "Standard High Pressure Molding Method" was also used for molding a thermoplastic matrix composite helmet which relates to a fabrication method using a combination of conventional compression molding and high pressure by hydroforming while the compression molding and hydroforming equipment were not located side-by-side or nearby from each other.

A standard high pressure molding method comprises:
a) Placing a helmet preform previously made in a pre-molding step from a stack of 0/90 prepreg layers in an oven to preheat to about 240° F. to 250° F.
b) Placing the pre-heated helmet preform previously made in the pre-molding step from a stack of 0/90 prepreg layers on a lower die of a matched metal die compression molding press where both dies are heated preferably at about 260° F. to 270° F.
c) Closing the compression molding press by bringing down the upper die until the dies close and applying pressures of about 1500 psi to 3000 psi for about 18-20 minutes, at constant die temperatures of about 260° F. to 270° F.
d) After the 15-20 minutes of the high temperature molding cycle, the molded helmet shell is held inside the press at the same high pressure, at about 1500 psi to 3000 psi, while the dies are cooled using, for example, cooling oil, until the dies temperature reach about 140° F. to 160° F. Once the compression molding dies reach a temperature about 140° F. to 160° F., the dies open and the molded thermoplastic matrix helmet is removed.
e) Once the molded helmet has cooled down to room temperature, optionally, it is trimmed to final dimensions.
f) Placing a molded helmet in an oven to be pre-heated, at about 260° F. to 270° F. for 30 to 45 minutes
g) Once the molded helmet shell has reached the about 260° F. to 270° F., it is removed from the oven and placed over the male punch of a hydroforming press. Closing the hydroforming press by bringing the upper die with the flexible rubber diaphragm over the molded thermoplastic helmet allowing the flexible rubber diaphragm to continuously and uniformly apply pressures at about 10,000 psi, while the thermoplastic matrix of the molded helmets solidifies and is cooled down from the about 260° F. to 270° F. down to about 140° F. to 160° F. of temperature, in less than 120 seconds (two minutes).
h) When the hydroforming cycle is complete after the helmet is cooled, the pressure in the forming chamber is released, the flexible rubber diaphragm returns to its rest position, and the highly consolidated thermoplastic matrix composite helmet is removed from the hydroforming press.
i) Once removed from the hydroforming high pressure cycle, the helmet is ready for the finishing operations that include drilling holes, painting, rubber edging and installing a suspension system and pads.

Example 1

Thermoplastic matrix composite ballistic helmets were molded using the conventional compression molding process with Dyneema HB-80 thermoplastic matrix 0/90 prepreg material in three helmet preform configurations, pinwheel, plus/plus pinwheel/rosette and Solid preform designs. As seen below in Table 5, 72 layers of Dyneema HB-80 were used per helmet to produce a helmet shell with 10.92 mm (0.430 inches) of wall thickness and 2.24 lbs/ft$^2$ of total area density not including the carbon-epoxy skin. During the compression molding cycle, a fine tuning takes place with the final number of the 0/90 ballistic prepreg layers where a few layers are removed to include the carbon-epoxy skin and to adjust the molding quality that produces molded helmet shells with a smooth surface, uniform prepreg material consolidation and uniform weight that meets the 2.24 lb/ft$^2$ of total area density weight requirement.

Figure 19:
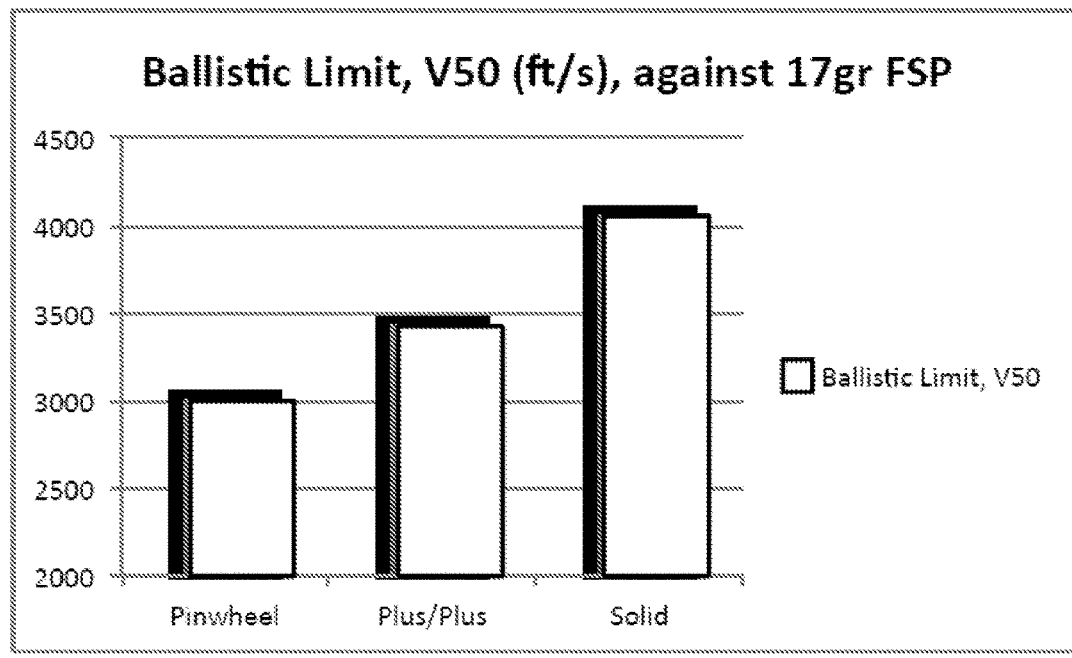
FIG. 19 is a bar chart showing an average ballistic limit, V50 (ft/s) of ACH helmets (2.2 psf) made with Dyneema HB-80 and molded by a conventional compression molding process as function of the helmet preform designs, in accordance with one or more embodiments of the present invention.

FIG. 19 is a bar chart showing an average ballistic limit, V50 (ft/s) of ACH helmets (2.2 psf) made with Dyneema HB-80 and molded by a conventional compression molding process as function of the helmet preform designs, in accordance with one or more embodiments of the present invention. In FIG. 19, the helmet preform design performance for the plus/plus pinwheel/rosette showed about a 15% increase in ballistic limit, V50 over the standard pinwheel pattern with overlaps, and the Solid Design with no-cuts and no-seams showed over a 30% increase in ballistic limit, V50 over the standard pinwheel pattern with overlaps.

Furthermore, it was discovered that, even though using the plus/plus pinwheel/rosette pattern design to control the fiber orientation between adjacent or neighboring 0/90 prepreg layers resulted in a uniform area density all around the molded helmet shell, a more consistent and far superior ballistic performance in the helmet crown area was obtained when compared with ballistic performance of the helmet side walls. The prevailing theory that could explain the superior ballistic performance of the crown area when compared with the helmet side walls was that in the crown area all the 0/90 prepreg layers were with no-cuts, no-seams, no-overlapping, and all aligned at 0° (zero degrees) of relative orientation between adjacent or neighboring 0/90 prepreg layers. The challenge was then to develop a method to assemble and fabricate a helmet preform with no-cuts, no-seams, no-overlapping and with all the 0/90 prepreg layers aligned at 0° (zero degrees) of relative orientation between adjacent or neighboring 0/90 prepreg layers throughout the whole helmet preform and the "Solid Preform Design" made by hydroforming was borne.

Example 2

Thermoplastic matrix composite ballistic helmets were molded using the thermoplastic matrix 0/90 prepreg materials Spectra Shield SR 3130, Dyneema HB-26 and Dyneema HB-80 as listed in Table 5. For each 0/90 prepreg material area density, Table 5 also includes the number of ballistic prepreg layers per helmet to produce a helmet shell with 0.92 mm (0.430 inches) of wall thickness and 2.24 lbs/ft$^2$ of total area density that includes the carbon-epoxy skin. During the compression molding cycle, a fine tuning takes place with the final number of the 0/90 ballistic prepreg layers where one or two layers are either increased or removed to adjust the molding quality that produces molded helmet shells with a smooth surface, uniform prepreg material consolidation and uniform weight that meets the 2.24 lb/ft$^2$ of total area density weight requirement.

TABLE 5

Uni-directional Thermoplastic Matrix UHMWPE 0/90 Prepreg Materials used for Molding Medium Size 2.24 lbs/ft$^2$ ACH Helmets.

| | Thermoplastic Matrix Composite Helmet 0/90 Prepreg Materials | | |
|---|---|---|---|
| | Spectra Shield SR-3130 | Dyneema HB-26 | Dyneema HB-80 |
| Helmet Area Density, psf (oz/yd2) | 2.24 | 2.24 | 2.24 |
| Helmet Wall Thickness, mm (inches) | 10.92 (0.430) | 10.92 (0.430) | 10.92 (0.430) |
| Fiber | UHMWPE | UHMWPE | UHMWPE |
| Fiber Construction/Prepreg | 0/90 | 0/90 | 0/90 |
| Prepreg Weight, g/m2 (oz/yd2) | 263 (7.75) | 276 (8.14) | 142 (4.18) |
| Thermoplastic Prepreg Matrix Resin | PU | PU | PU |

TABLE 5-continued

Uni-directional Thermoplastic Matrix UHMWPE 0/90 Prepreg Materials used for Molding Medium Size 2.24 lbs/ft$^2$ ACH Helmets.

| | Thermoplastic Matrix Composite Helmet 0/90 Prepreg Materials | | |
|---|---|---|---|
| | Spectra Shield SR-3130 | Dyneema HB-26 | Dyneema HB-80 |
| Number of Layers/Molded Helmet | 38 | 37 | 72 |

All helmets were made using the plus/plus pinwheel/rosette pattern design for the ballistic 0/90 prepreg layers. The structural skin was made using two 0/90 carbon-epoxy prepreg C24T700150 with a total area density of 468 g/m2 (13.76 oz/yd2). The carbon-epoxy preform was incorporated on the outside surface of the helmet during the compression molding cycle. All helmets with carbon-epoxy skin were molded in a 10.92 mm (0.430 inches) die cavity using the "Standard High Pressure Molding Method". For Dyneema HB-26 and HB-80 the temperature of the pre-heating oven was about 240° F. to 250° F. The actual mold temperatures of the male and female steel dies were kept at about 260° F. to 270° F. All helmets where cooled down to about 140° F. temperature.

The ballistic properties of the helmets were measured by the ballistic limit $V_{50}$ (m/s) test according to the test procedure specified on the MIL-STD-662F latest revision dated Dec. 18, 1997. Helmets were tested for the ballistic limit $V_{50}$ (m/s) against fragments 4-grain, 16-grain, and 64-grain Right Circular Cylinder (RCC) and 17-grain Fragment Simulator projectiles (FSP). The V50 calculation was determined based on the average of at least 3 pairs of fragments penetrating the helmet and being stopped by the helmet within a range of velocities of 38.10 m/s (125 feet/sec). The Ballistic Test Data from testing carried out at a NIJ certified laboratory is summarized in Table 6 below.

TABLE 6

Ballistic Performance of ACH Helmets made with three 0/90 Prepreg Materials using the Plus/Plus Helmet Preform Pattern Design and the Standard High Pressure Molding Method.

| Fragment grain | ACH Requirements | Spectra Shield SR-3130 | Dyneema HB-26 | Dyneema HB-80 |
|---|---|---|---|---|
| 4-grain RCC | 3450 | 5367/56% | 5342/55% | N/A |
| 16-grain RCC | 2425 | 3500/44% | 3632/50% | 3503/44.5% |
| 64-grain RCC | 1700 | 2556/50% | 2547/50% | 2482/46% |
| 17-grain FSP | 2200 | 3251/48% | 3208/46% | 3273/48.8% |

As the ballistic data above demonstrate, when ballistic helmets are made from a 0/90 cross-plied uni-directional UHMWPE fibers thermoplastic matrix resin prepreg layers, using the new plus/plus pinwheel/rosette pattern design to control the fiber orientation between adjacent or neighboring 0/90 prepreg layers, and molded by the "Standard High Pressure Molding Method" with a carbon-epoxy skin on the outside, the ballistic performance of the helmets are far superior than the para-aramid ACH currently manufactured. Depending upon the ballistic ammunition, the ballistic performance against RCC and FSP increased between 44% and 56% when compared to the current para-aramid ACH helmet requirements.

Example 3

In Example 3, everything done in Example 2 was repeated, except that only Dyneema HB-80 was used as the 0/90 cross-plied uni-directional UHMWPE fibers thermoplastic matrix resin prepreg layers and hydroforming was used as the new method for making a "Solid Preform" design with no-cuts, no-seam and to keep all the 0/90 prepreg layers aligned at 0° (zero degrees) of relative orientation between adjacent or neighboring 0/90 prepreg layers throughout the whole helmet molded shell. In addition, all helmet shells produced with 10.92 mm (0.430 inches) of wall thickness and 2.24 lbs/ft$^2$ of total area density that includes the carbon-epoxy skin were molded by the "Standard High Pressure Molding Method" with a carbon-epoxy skin on the outside. The ballistic data is summarized in Table 7.

As a result, and as the ballistic data in Table 7 below demonstrate, the ballistic performance of the helmets molded from Dyneema HB-80 preforms using the "Solid Design" is far superior than the ballistic performance of helmets made with the same 0/90 cross-plied uni-directional UHMWPE fibers thermoplastic matrix resin prepreg layers of Dyneema HB-80 using the Plus/Plus pinwheels/rosette pattern design. Depending upon the ballistic ammunition, the ballistic performance against RCC and FSP increased between 76% and 81% when compared to the current para-aramid ACH helmet requirements.

TABLE 7

Ballistic Performance Comparison Between ACH Helmets made with the Plus/Plus Helmet Preform Pattern Design and the Solid Preform Design Molded by the Standard High Pressure Molding Method. Ballistic Limit, V50 (ft/s), Plus/Plus vs Solid Preform Designs

| Fragment grain | ACH Requirements | Dyneema HB-80 Plus/Plus Design | Dyneema HB-80 Solid Design |
|---|---|---|---|
| 4-grain RCC | 3450 | N/A | 5423 (P)/NA |
| 16-grain RCC | 2425 | 3503/44.5% | 4391/81% |
| 64-grain RCC | 1700 | 2482/46% | 3015/77% |
| 17-grain FSP | 2200 | 3273/48.8% | 3862/76% |

Comparing the $V_{50}$ values of Dyneema HB-80 helmets using the plus/plus pinwheel/rosette pattern design and the solid preform designs, also it was observed that the solid preform design is a superior design than the Plus/Plus, because the $V_{50}$ values from the helmet side walls are the same as to the $V_{50}$ values from the crown.

In addition, comparing the ballistic data of Dyneema HB-80 shown in Table 6, it is observed that on average the ballistic performance of Dyneema HB-80 was not better than Dyneema HB-26 when using the plus/plus pinwheel/rosette pattern design and molded by the Standard High Pressure Molding Method. However, it is worth noting the fact that helmets made with Dyneema HB-80 "Solid Design" preform and molded by the same Standard High Pressure Molding Method has provided HB-80 helmets with exceptionally superior ballistic performance against small rifle fire as illustrated by helmets stopping 7.62×39 mm FMJLC at muzzle velocities of about 2750 ft/s, as shown in Table 8.

TABLE 8

Ballistic Performance Against Small Rifle Fire Between ACH Helmets made with Dyneema HB-80 Plus/Plus Helmet Preform Pattern Design and the Solid Preform Design Molded by the Standard Molding Method. Ballistic Limit, V50, Dyneema HB-80 Plus/Plus vs Solid Preform Designs

| Rifle Fire Bullet | ACH Requirements | Dyneema HB-80 Plus/Plus Design | Dyneema HB-80 Solid Design |
|---|---|---|---|
| 7.62 × 39 mm LC | None | 2520 | 2782 |

Example 4

Since one of the US Army greatest challenges has been to reduce the weight of personnel body armor carried by a soldier, including ballistic vests and helmets, in Example 4, everything done in Example 3 was repeated, including the use of Dyneema HB-80 as the 0/90 cross-plied uni-directional UHMWPE fibers thermoplastic matrix resin prepreg layers, the use of the new method of hydroforming for making a "Solid Preform" design with no-cuts, no-seam and to keep all the 0/90 prepreg layers aligned at 0° (zero degrees) of relative orientation between adjacent or neighboring 0/90 prepreg layers throughout the whole helmet molded shell. In addition, all helmets were molded by the "Standard High Pressure Molding Method" with a carbon-epoxy skin on the outside, except that the helmet shells were produced with 7.11 mm (0.280 inches) of wall thickness and 1.65 lbs/ft$^2$ of total area density that includes the carbon-epoxy skin, resulting in a helmet shell 26% lighter than the para-aramid ACH currently manufactured and still with a ballistic performance 41% superior than the 2.24 lbs/ft$^2$ standard ACH helmet.

TABLE 9

ACH and Light Weight ACH Helmets molded with Dyneema HB-80 UHMWPE 0/90 Prepreg Materials and Solid Preform Design.

| | Thermoplastic Matrix Composite Helmet 0/90 Prepreg Materials | |
|---|---|---|
| | Dyneema HB-80 | Dyneema HB-80 |
| Helmet Area Density, psf (oz/yd2) | 2.24 | 1.65 |
| Helmet Wall Thickness, mm (inches) | 10.92 (0.430) | 7.11 (0.280) |
| Fiber | UHMWPE | UHMWPE |
| Fiber Construction/Prepreg | 0/90 | 0/90 |
| Prepreg Weight, g/m2 (oz/yd2) | 142 (4.18) | 142 (4.18) |
| Thermoplastic Prepreg Matrix Resin | PU | PU |
| Number of Layers/Molded Helmet | 72 | 40 |

The ballistic data is summarized in Table 10 below.

TABLE 10

Ballistic Performance Comparison Between ACH and Light Weight ACH Helmets made with Dyneema HB-80 Solid Preform Design and molded by the Standard High Pressure Molding Method. Ballistic Limit V50 (ft/s), Standard High Pressure Molding Method

| Fragment grain | ACH Requirements | Dyneema HB-80 2.24 lb/ft2 | Dyneema HB-80 1.65 lbs/ft2 |
|---|---|---|---|
| 17-grain FSP | 2200 | 3862/76% | 3100/41% |

Example 5

In Example 5, everything done in Example 4 was repeated, including the use of Dyneema HB-80 as the 0/90 cross-plied uni-directional UHMWPE fibers thermoplastic matrix resin prepreg layers, the use of the new method of hydroforming for making a "Solid Preform" design with no-cuts, no-seam and to keep all the 0/90 prepreg layers aligned at 0° (zero degrees) of relative orientation between adjacent or neighboring 0/90 prepreg layers throughout the whole helmet molded shell. In addition, all the helmet shells were produced with 7.11 mm (0.280 inches) of wall thickness and 1.65 lbs/ft² of total area density that includes the carbon-epoxy skin; except that helmets were molded by two molding methods with a carbon-epoxy skin on the outside, the "Standard High Pressure Molding Method" and the "Short Cycle Molding Method".

TABLE 11

Ballistic Performance Comparison Against 17 grain FSP Between Light Weight ACH Helmets made with Dyneema HB-80 Solid Preform Design and molded by two Molding Methods.

| Solid Preform Construction | ACH Requirements | Standard High Pressure Molding Method | Short Cycle Molding Method |
|---|---|---|---|
| 100% Dyneema HB-80 | 2200 | 2993/36% | 3050/39% |
| Dyneema HB-80 & C-Epoxy Outside | 2200 | 3008/37% | 3148/43% |

The Dyneema HB-80 Solid Preform Design Light Weight ACH helmets were tested for their ballistic performance using the same 17 grain FSP and the results are shown in the Table 11 and FIG. 20 below. Table 11 and FIG. 20 illustrate that, on average, the same ballistic performance is obtained for Dyneema HB-80 solid preform design helmets when molded with either molding method, i.e., the "Standard High Pressure Molding Method" or the "Short Cycle Molding Method".

Furthermore, it can be observed that using a carbon-epoxy skin on the outside does not reduce the ballistic performance of the 0/90 cross-plied uni-directional UHMWPE fibers thermoplastic matrix resin composite helmets when made by either molding method. To the contrary, it has been found that the carbon-epoxy skin on the outside of the molded thermoplastic matrix helmets not only improves the structural characteristics of the molded thermoplastic matrix composite helmet shell, but also slightly improves their ballistic performance against small fragments including 2-grain, 4-grain and 16-grain Right Circular Cylinder (RCC) and 17-grain Fragment Simulator projectiles (FSP). As a result, using the carbon-epoxy skin on the outside of the molded thermoplastic matrix helmets increases the structural properties of the molded helmet shell, without sacrificing ballistic properties.

Figure 20:
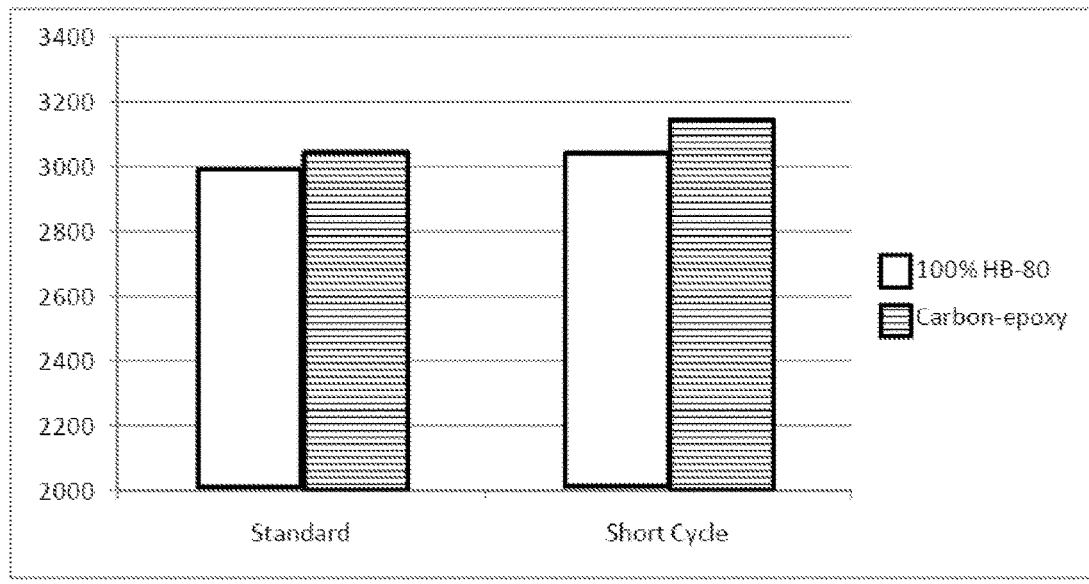
FIG. 20 is a bar chart showing a ballistic performance comparison against 17 grain FSP between light weight ACH helmets made with Dyneema HB-80 solid preform design and molded by two molding methods, in accordance with one or more embodiments of the present invention.

FIG. 20 is a bar chart showing a ballistic performance comparison against 17 grain FSP between light weight ACH helmets made with Dyneema HB-80 solid preform design and molded by two molding methods, in accordance with one or more embodiments of the present invention.

As illustrated by FIG. 20, for the purposes of the present invention, the most important innovation, in addition to the high ballistic performance, is the reduction of the molding cycle time from hours down to minutes, turning the "Short Cycle Molding Method" into a true low cost and high volume manufacturing process for making ballistic helmets with 0/90 cross-plied uni-directional para-aramid or UHMWPE fibers thermoplastic matrix resin composite materials.

Example 6

In Example 6, everything done in Example 5 was repeated, including the use of Dyneema HB-80 as the 0/90 cross-plied uni-directional UHMWPE fibers thermoplastic matrix resin prepreg layers, the use of the new method of hydroforming for making a "Solid Preform" design with no-cuts and no-seam; except that not all the 0/90 prepreg layers were aligned at 0° (zero degrees) of relative orientation between adjacent or neighboring 0/90 prepreg layers throughout the whole helmet molded shell. For this particular example, 25% of the inside 0/90 prepreg layers were rotated with an increasing 22° angle from the previous prepreg layer.

In addition, all the helmet shells were produced with 7.11 mm (0.280 inches) of wall thickness and 1.65 lbs/ft² of total area density that includes the carbon-epoxy skin; except that helmets were molded by two molding methods with a carbon-epoxy skin on the outside, the "Standard High Pressure Molding Method" and the "Short Cycle Molding Method".

Figure 21:
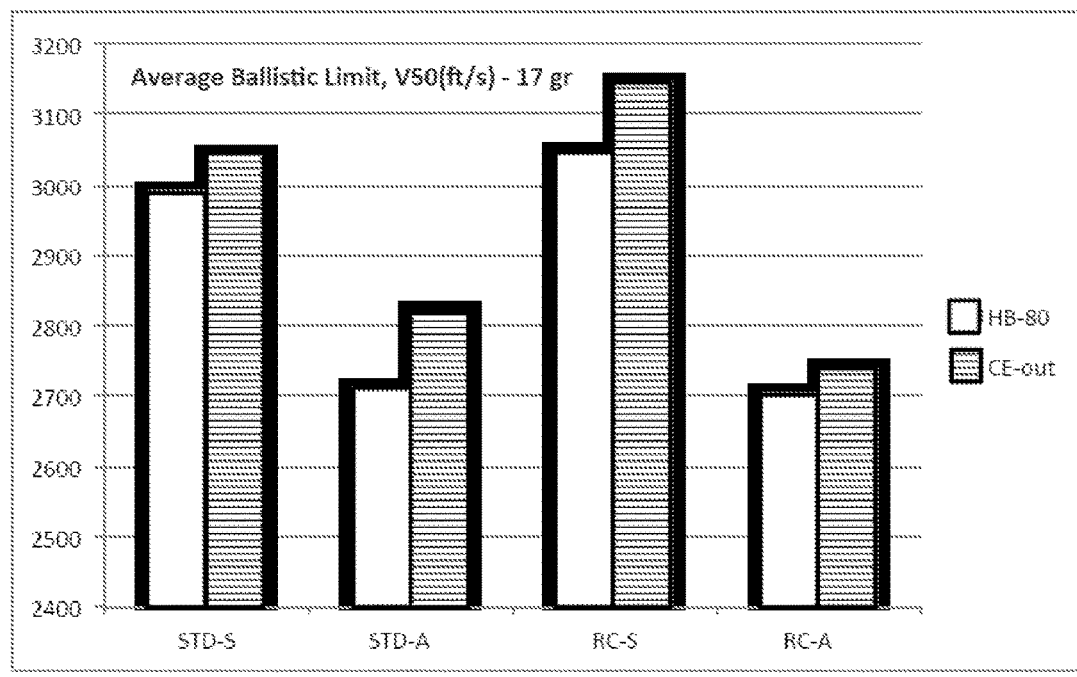
FIG. 21 is a bar chart showing a ballistic performance comparison against 17 grain FSP between light weight ACH helmets made with Dyneema HB-80 solid preform design and molded by two molding methods and with 22° Fiber Orientation Changes of 25% of Inside prepreg Layers, in accordance with one or more embodiments of the present invention.

FIG. 21 is a bar chart showing a ballistic performance comparison against 17 grain FSP between light weight ACH helmets made with Dyneema HB-80 solid preform design and molded by two molding methods and with 22° Fiber Orientation Changes of 25% of Inside prepreg Layers, in accordance with one or more embodiments of the present invention.

As shown in FIG. 21, the change of 22° of fiber orientation made in 25% of the inside layers in the helmet produced a decrease on the ballistic limit, $V_{50}$ (ft/s), of 300 ft/s on average. In FIG. 21, the helmets made with preforms having a 22° fiber orientation change among 25% of the inside prepreg layers were labeled 22° Design. In addition, the "Short Cycle Molding Method" was labeled RC that stands for Rapid Cooling.

In accordance with an embodiment of the present invention, a method of manufacturing a ballistic helmet preform includes heating a stack of 0/90 fabric layers impregnated with at least one resin at between 150° F. to 200° F. for about 20 to 45 minutes; placing the heated stack of impregnated 0/90 fabric layers on a hydroforming blank holding ring on a hydroforming press; closing the hydroforming press to bring a flexible rubber diaphragm against a top of the heated stack of impregnated 0/90 fabric layers; pressurizing a forming chamber behind the flexible rubber diaphragm with a hydraulic oil to about 800-1500 psi; raising a punch having a predefined shape and dimensions of an inside of a helmet preform from a bottom portion of the hydroforming press against a bottom of the heated stack of impregnated 0/90 fabric layers and up against the flexible rubber diaphragm and into the forming chamber; holding the punch in the raised position for 10 to 15 seconds to form the preform; lowering the punch back into the bottom portion of the hydroforming press; opening the hydroforming press; and removing the helmet preform.

A method of manufacturing a ballistic helmet including hydroforming a helmet preform from a stack of 0/90 fabric layers impregnated with at least one resin; placing the helmet preform on a lower die of a matched metal die compression molding press that has been heated to between about 250° F. to 350° F.; closing the matched metal die compression molding press by bringing an upper die portion down on to the lower die portion of the matched metal die compression molding press; applying between about 500 psi and 3000 psi to the helmet preform for between about 15 to 25 minutes at between about 250° F. to 350° F. to form a molded helmet; cooling the matched metal die compression molding press and the molded helmet down to between about 100° F. to 180° F. over about 20 minutes at between about 500 psi and 3,000 psi; and removing the molded helmet from the matched metal die compression molding press.

A method of manufacturing a ballistic helmet including hydroforming a helmet preform from a stack of 0/90 fabric layers impregnated with at least one resin; placing the helmet preform on a lower die of a matched metal die compression molding press that has been heated to between about 250° F. to 350° F.; closing the matched metal die compression molding press by bringing an upper die portion down on to the lower die portion of the matched metal die compression molding press; applying between about 500 psi to 3000 psi to the helmet preform for between about 15 to 25 minutes at between about 250° F. to 350° F. to form a molded helmet; removing the molded helmet from the matched metal die compression molding press; placing the molded helmet on a helmet-shaped punch in a hydroforming press; closing the hydroforming press to bring a flexible rubber diaphragm down against a top of the molded helmet; continuously and uniformly applying about 6000 psi to 10,000 psi of pressure while cooling the molded helmet down to between about 100° F. to 180° F. over about 2 minutes in the hydroforming press; and removing the molded helmet from the hydroforming press.

A method of manufacturing a ballistic helmet including hydroforming a helmet preform from a stack of 0/90 fabric layers impregnated with at least one resin; heating the helmet preform to between about 240° F. to 250° F.; placing the heated helmet preform on a lower die of a matched metal die compression molding press that has been heated to between about 260° F. to 270° F.; closing the matched metal die compression molding press by bringing an upper die portion down on to the lower die portion of the matched metal die compression molding press; applying between about 1,500 psi to 3,000 psi pressure to the helmet preform for between about 18 to 20 minutes at between about 260° F. to 270° F. in the matched metal die compression molding press to form a molded helmet; cooling the matched metal die compression molding press and the molded helmet to between about 140° F. to 160° F. while maintaining between about 1,500 psi to 3,000 psi pressure to the helmet preform; removing the molded helmet from the matched metal die compression molding press; heating the molded helmet at about 260° F. to 270° F. for 30 to 45 minutes; placing the heated molded helmet on a helmet-shaped punch in a hydroforming press; closing the hydroforming press to bring a flexible rubber diaphragm down against a top of the heated molded helmet; continuously and uniformly applying about 6000 psi to 10,000 psi of pressure while cooling the molded helmet down to between about 100° F. to 180° F. over about 2 minutes in the hydroforming press; and removing the molded helmet from the hydroforming press.

As will be appreciated from the foregoing description the present invention provides a method of manufacturing a ballistic helmet using thermoplastic matrix composite materials to obtain a pre-consolidated helmet preform with no cuts or seams and a method of molding the helmet under very high pressure during the cooling down cycle.

The invention having been described in certain embodiments, it will be apparent to those skilled in the art that many changes and alterations can be made without departing from the spirit of the invention. Accordingly, Applicant intends to embrace all such alternatives, modifications, equivalents and variations in keeping therewith.

What is claimed is:

1. A method of manufacturing a ballistic helmet preform comprising:
   a. placing a flat stack of pre-heated 0/90 fabric layers impregnated with at least one resin on a hydroforming blank holding ring of a hydroforming press, wherein the flat stack of pre-heated fabric layers is preheated to between 150° F. to 200° F.;
   b. closing the hydroforming press to bring a flexible rubber diaphragm against a top of the flat stack of impregnated 0/90 fabric layers;
   c. pressurizing a forming chamber behind the flexible rubber diaphragm with a hydraulic oil to about 800-1500 psi;
   d. raising the punch having a predefined shape and dimensions of an inside of a helmet from the bottom portion of the hydroforming press against a bottom of the flat stack of pre-heated 0/90 fabric layers and up against the flexible rubber diaphragm and into the forming chamber to a predetermined punch height;
   e. holding the punch in the raised position to form and consolidate a helmet preform with no overlaps, no seams, no cuts and a controlled orientation of the fibers;
   f. lowering the punch back into the bottom portion of the hydroforming press;
   g. opening the hydroforming press; and
   h. removing the helmet preform.

2. The method of claim 1 wherein each of the 0/90 fabric layers is made from cross-plied, uni-directional fibers.

3. The method of claim 2 wherein each of the 0/90 fabric layers is made from cross-plied, uni-directional para-aramid fibers.

4. The method of claim 2 wherein each of the 0/90 fabric layers is made from cross-plied, uni-directional ultra-high molecular weight polyethylene fibers.

5. The method of claim 1, wherein the punch is held in the raised position for 10 to 15 seconds.

6. A method of manufacturing a ballistic helmet comprising:
   a. placing a flat stack of pre-heated 0/90 fabric layers impregnated with at least one resin on a hydroforming blank holding ring of a hydroforming press, wherein the flat stack of pre-heated fabric layers is preheated to between 150° F. to 200° F.;
   b. closing the hydroforming press to bring a flexible rubber diaphragm against a top of the flat stack of impregnated 0/90 fabric layers;
   c. pressurizing a forming chamber behind the flexible rubber diaphragm with a hydraulic oil to about 800-1500 psi;
   d. raising the punch having a predefined shape and dimensions of an inside of a helmet from the bottom portion of the hydroforming press against a bottom of the flat stack of pre-heated 0/90 fabric layers and up against the flexible rubber diaphragm and into the forming chamber to a predetermined punch height;
   e. holding the punch in the raised position to form and consolidate a helmet preform with no overlaps, no seams, no cuts and a controlled orientation of the fibers;
   f. lowering the punch back into the bottom portion of the hydroforming press;
   g. opening the hydroforming press;
   h. removing the helmet preform;

i. placing the hydroformed helmet preform made of a stack of 0/90 fabric layers impregnated with at least one resin on a lower die of a compression molding press where the matched metal dies have been heated to at least 250° F.;
j. closing the matched metal dies on the compression molding press by bringing an upper die portion down on to the lower die portion of the matched metal die compression molding press;
k. applying at least 500 psi to the helmet preform during heating to at least 15 minutes while heating to at least 250° F. to mold a helmet;
l. cooling the matched metal die compression molding press and the molded helmet down to between about 100° F. to 240° F. while applying at least 500 psi of pressure; and
m. removing the molded helmet from the matched metal die compression molding press.

7. The method of claim 6 wherein each of the 0/90 fabric layers is made from cross-plied, uni-directional fibers.

8. The method of claim 7 wherein each of the 0/90 fabric layers is made from cross-plied, uni-directional para-aramid fibers.

9. The method of claim 7 wherein each of the 0/90 fabric layers is made from cross-plied, uni-directional ultra-high molecular weight polyethylene fibers.

10. The method of claim 6, wherein the punch is held in the raised position for 10 to 15 seconds.

11. A method of manufacturing a ballistic helmet comprising:
   a. placing a flat stack of pre-heated 0/90 fabric layers impregnated with at least one resin on a hydroforming blank holding ring of a hydroforming press;
   b. closing the hydroforming press to bring a flexible rubber diaphragm against a top of the flat stack of impregnated 0/90 fabric layers;
   c. pressurizing a forming chamber behind the flexible rubber diaphragm with a hydraulic oil to about 800-1500 psi;
   d. raising the punch having a predefined shape and dimensions of an inside of a helmet from the bottom portion of the hydroforming press against a bottom of the flat stack of pre-heated 0/90 fabric layers and up against the flexible rubber diaphragm and into the forming chamber to a predetermined punch height;
   e. holding the punch in the raised position to form and consolidate a helmet preform with no overlaps, no seams, no cuts and a controlled orientation of the fibers;
   f. lowering the punch back into the bottom portion of the hydroforming press;
   g. opening the hydroforming press; and
   h. removing the helmet preform;
   i. placing the helmet preform made of a stack of 0/90 fabric layers impregnated with at least one resin on a lower die of a compression molding press where the matched metal dies have been heated to at least 250° F.;
   j. closing the matched metal dies on the compression molding press by bringing an upper die portion down on to the lower die portion of the matched metal die compression molding press;
   k. applying at least 500 psi to the helmet preform during heating to at least 15 minutes while heating to at least 250° F. to mold a helmet;
   l. removing the molded helmet from the matched metal die compression molding press;
   m. placing the molded helmet on a helmet-shaped punch in a hydroforming press;
   n. closing the hydroforming press to bring a flexible rubber diaphragm down against a top of the molded helmet;
   o. continuously and uniformly applying at least 3000 psi of pressure while cooling the molded helmet down to between about 100° F. to 240° F. in the hydroforming press; and
   p. removing the molded helmet from the hydroforming press.

12. The method of claim 11 wherein each of the 0/90 fabric layers is made from cross-plied, uni-directional fibers.

13. The method of claim 12 wherein each of the 0/90 fabric layers is made from cross-plied, uni-directional para-aramid fibers.

14. The method of claim 12 wherein each of the 0/90 fabric layers is made from cross-plied, uni-directional ultra-high molecular weight polyethylene fibers.

15. The method of claim 11, wherein the flat stack of pre-heated fabric layers is preheated to between 150° F. to 200° F.

16. The method of claim 11, wherein the punch is held in the raised position for 10 to 15 seconds.

* * * * *